US012327946B2

(12) United States Patent
Masutani et al.

(10) Patent No.: US 12,327,946 B2
(45) Date of Patent: Jun. 10, 2025

(54) CONNECTOR TO BE CONNECTED TO A PARTNER CONNECTION TARGET

(71) Applicant: J.S.T. Mfg. Co. Ltd., Tokyo (JP)

(72) Inventors: Yoshitomo Masutani, Osaka (JP); Takahiro Ishikawa, Osaka (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 344 days.

(21) Appl. No.: 17/991,679

(22) Filed: Nov. 21, 2022

(65) Prior Publication Data

US 2023/0178921 A1 Jun. 8, 2023

(30) Foreign Application Priority Data

Dec. 3, 2021 (JP) ................................ 2021-196738

(51) Int. Cl.
*H01R 13/422* (2006.01)

(52) U.S. Cl.
CPC ................................ *H01R 13/4223* (2013.01)

(58) Field of Classification Search
CPC .................................................. H01R 13/4223
USPC ............................................... 439/595, 733.1
See application file for complete search history.

(56) References Cited

U.S. PATENT DOCUMENTS 5,520,553 A * 5/1996 Cecil, Jr. ............ H01R 13/4368 439/595
6,068,512 A * 5/2000 Sugie ................. H01R 13/4365 439/595
6,106,340 A * 8/2000 Myer ................. H01R 13/4367 439/752
6,244,900 B1 * 6/2001 Ishikawa .............. H01R 13/642 439/744
6,692,302 B1 * 2/2004 Tsuji .................. H01R 13/4223 439/595
6,769,934 B2 * 8/2004 Nakamura ......... H01R 13/4223 439/595
6,948,986 B2 * 9/2005 Kojima ............. H01R 13/4223 439/752
7,445,523 B2 * 11/2008 Onoda ............... H01R 13/4365 439/752
7,862,374 B2 * 1/2011 Ichio .................. H01R 13/4223 439/752

(Continued)

FOREIGN PATENT DOCUMENTS

JP 2003-115336 A 4/2003
JP 2005-216810 A 8/2005

*Primary Examiner* — Marcus E Harcum
(74) *Attorney, Agent, or Firm* — Kratz, Quintos & Hanson, LLP

(57) ABSTRACT

A contact is provided with an engaging portion for engaging with a housing. The housing is provided with an insertion end portion for insertion of the contact, a connection end portion for connection to a partner connection target, a contact insertion hole, and an engagement arm extending in a cantilevered manner from the connection end portion toward the insertion end portion. The engagement arm includes an engaged portion for engaging with the engaging portion, and an extension arm portion extending from the engaged portion toward the insertion end portion. The extension arm portion faces an inner wall defining the contact insertion hole with a space therebetween, and restricts the flexing amount of the engagement arm by the tip side of the extension arm portion abutting against the inner wall when the engagement arm flexes.

4 Claims, 18 Drawing Sheets

(56) References Cited

U.S. PATENT DOCUMENTS

| | | | | |
|---|---|---|---|---|
| 7,867,029 | B2 * | 1/2011 | Takahashi | H01R 13/4223 439/595 |
| 8,708,759 | B2 * | 4/2014 | Hirabayashi | H01R 13/113 439/852 |
| 8,747,156 | B2 * | 6/2014 | Hirabayashi | H01R 13/4223 439/595 |
| 8,747,157 | B2 * | 6/2014 | Tashiro | H01R 13/506 439/246 |
| 8,747,169 | B2 * | 6/2014 | Ito | H01R 13/4361 439/752 |
| 8,784,141 | B2 * | 7/2014 | Ishikawa | H01R 43/20 439/752 |
| 8,845,362 | B2 * | 9/2014 | Chikusa | H01R 13/6275 439/595 |
| 8,858,259 | B2 * | 10/2014 | Chikusa | H01R 13/6271 439/595 |
| 11,088,483 | B2 * | 8/2021 | Chiba | H01R 13/114 |
| 2001/0055907 | A1 * | 12/2001 | Murakami | H01R 13/4365 439/595 |
| 2002/0064993 | A1 * | 5/2002 | Kato | H01R 13/4223 439/595 |
| 2003/0190841 | A1 * | 10/2003 | Nakamura | H01R 13/4223 439/595 |
| 2005/0170702 | A1 | 8/2005 | Ishikawa | |
| 2005/0176298 | A1 * | 8/2005 | Flowers | H01R 13/4365 439/595 |
| 2005/0186842 | A1 * | 8/2005 | Fukatsu | H01R 13/4223 439/595 |
| 2006/0141862 | A1 * | 6/2006 | Machida | H01R 13/4365 439/595 |
| 2006/0141863 | A1 * | 6/2006 | Sakamoto | H01R 13/4223 439/595 |
| 2007/0275599 | A1 * | 11/2007 | Sugiyama | H01R 13/4365 439/595 |
| 2008/0003876 | A1 * | 1/2008 | Fukaya | H01R 13/5208 439/595 |
| 2008/0119091 | A1 * | 5/2008 | Nishide | H01R 13/4362 439/733.1 |
| 2009/0098779 | A1 * | 4/2009 | Kawamura | H01R 13/65912 439/733.1 |
| 2010/0136819 | A1 * | 6/2010 | Mase | H01R 13/743 439/345 |
| 2013/0143440 | A1 * | 6/2013 | Suzuki | H01R 13/516 439/595 |
| 2014/0342606 | A1 * | 11/2014 | Endo | H01R 13/4223 439/595 |
| 2017/0294730 | A1 * | 10/2017 | Inaka | H01R 13/426 |
| 2022/0239029 | A1 * | 7/2022 | Nakai | H01R 13/11 |

* cited by examiner

CONNECTOR TO BE CONNECTED TO A PARTNER CONNECTION TARGET

CROSS-REFERENCE TO RELATED APPLICATION

This application claims priority to Japanese Patent Application No. 2021-196738. The entire disclosure of Japanese Patent Application No. 2021-196738 is hereby incorporated herein by reference.

BACKGROUND OF THE INVENTION

1. Field of the Invention

The present invention relates to a connector that is for connection to a partner connection target and includes a contact, which is for connection to an electrical wire, and a housing for receiving insertion of the contact and holding the contact.

2. Description of Related Art

As one example of a conventionally-used connector, there is a connector that is for connection to a partner connection target and includes a contact, which is for connection to an electrical wire, and a housing for receiving insertion of the contact and holding the contact. In this connector, the housing is provided with an insertion end portion, which is the end portion into which the contact is inserted, a connection end portion, which is the end portion for connection to the partner connection target, and a contact insertion hole that extends through the housing from the insertion end portion to the connection end portion and receives insertion of the contact. Furthermore, in such a connector, in order to hold the contact, the housing is provided with an engagement arm that engages with the contact that has been inserted into the contact insertion hole. For example, JP 2005-216810A and JP 2003-115336. A disclose known examples of a connector including a housing that is provided with an engagement arm for engaging with a contact that has been inserted into the contact insertion hole, in order to hold the contact in the housing.

The connector disclosed in JP 2005-216810A includes a terminal fitting 30 as a contact and a housing 10 provided with a cavity 11 as a contact insertion hole for receiving insertion of the terminal fitting 30. In the housing 10, the cavity 11 extends from the insertion end portion of the housing 10 to the connection end portion of the same. The housing 10 is also provided with a lance 17 as an engagement arm for engaging with the terminal fitting 30. The lance 17 is provided in the housing 10 so as to extend in a cantilevered manner from the insertion end portion side toward the connection end portion, and is configured to engage with the terminal fitting 30 that has been inserted into the cavity 11.

The connector disclosed in JP 2003-115336A includes a fink-shaped terminal 13 as a contact and a housing 1 provided with a terminal housing portion 2 as a contact insertion hole for receiving insertion of the fork-shaped terminal 13. In the housing 1, the terminal housing portion 2 extends from the insertion end portion of the housing 1 to the connection end portion of the same. Also, the housing 1 is provided with a lance-shaped locking piece 14 as an engagement arm for engaging with the fork-shaped terminal 13. The lance-shaped locking piece 14 is provided in the housing 1 so as to extend in a cantilevered manner from the connection end portion side toward the insertion end portion, and is configured to engage with the fork-shaped terminal 13 that has been inserted into the terminal housing portion 2.

SUMMARY OF THE INVENTION

In the connector disclosed in JP 2005-216810A, the lance 17, which is for engaging with the terminal fitting 30 inserted into the cavity 11, extends in a cantilevered manner from the insertion end portion side of the housing 10 toward the connection end portion of the same. Accordingly, the tip-side portion of the cantilevered lance 17 extends on the connection end portion side of the housing 10. Here, in order to protect the tip-side portion of the cantilevered lance 17 from the outside, it is necessary to prevent the tip-side portion of the lance 17 from protruding outward from the wall portion of the housing 10. For this reason, in the connector disclosed in JP 2005-216810A, in order to be able to sufficiently house and protect the tip-side portion of the cantilevered lance 17, the portion of the housing 10 on the connection end portion side, which is for housing the tip-side portion of the lance 17, needs to have a sufficiently large thickness overall.

On the other hand, there are cases where there is a demand to reduce the thickness of the portion on the connection end portion side of the housing due to a constraint in terms of the structure of the partner connection target to which the connector is to be connected. However, in the connector disclosed in JP 2005-216810A, it is necessary to sufficiently increase the thickness of the portion of the housing 10 on the connection end portion side for housing the tip-side portion of the cantilevered lance 17, and therefore it is difficult to reduce the thickness of the portion on the connection end portion side of the housing 10. For this reason, with the connector disclosed in JP 2005-216810A, there is a problem that it is difficult to reduce the thickness of the portion on the connection end portion side of the housing 10 in accordance with a constraint imposed by the partner connection target.

In the connector disclosed in JP 2003-115336A, the lance-shaped locking piece 14 for engaging with the fork-shaped terminal 13 inserted into the terminal housing portion 2 extends in a cantilevered manner from the connection end portion side of the housing 1 toward the insertion end portion of the same. Accordingly, the tip-side portion of the cantilevered lance-shaped locking piece 14 extends on the insertions end portion side of the housing 1. Therefore, the tip-side portion of the cantilevered lance-shaped locking piece 14 is housed inside the portion on the insertion end portion side of the housing 1 and protected from the outside. Accordingly, if there is a demand to reduce the thickness of the portion on the connection end portion side of the housing due to a constraint in terms of the structure of the partner connection target to which the connector is connected, such a demand can be met.

However in the connector disclosed in JP 2003-115336A, the lance-shaped locking piece 14 extends in a cantilevered manner from the connection end portion side the housing 1 toward the insertion end portion of the same, and is configured such that the tip side of the cantilevered locking piece engages with the fork-shaped terminal 13. For this reason, if the fork-shaped terminal 13 engaged with the lance-shaped locking piece 14 is biased in a direction of coming out of the housing 1, that is to say if the fork-shaped terminal 13 is biased toward the insertion end portion side of the housing 1, the lance-shaped locking piece 14 can flex easily, and the fork-shaped terminal 13 can be easily pulled out of the housing 1. Accordingly, with the connector disclosed in JP 2003-115336A there is a problem that the fork-shaped terminal 13 can be easily pulled out of the housing 1, and there is a reduction in the contact holding force for holding the fork-shaped terminal 13 (contact) in the housing. Furthermore, the connector disclosed in JP 2003-115336A, if the fork-shaped terminal 13 engaged with the lance-shaped locking piece 14 is biased in a direction of coming out of the housing 1, that is to say if the fork-shaped terminal 13 is biased toward the insertion end portion side of the housing 1, the lance-shaped locking piece 14 can flex easily and therefore there is a risk of the lance-shaped locking piece 14 flexing excessively. If the lance-shaped locking piece 14 flexes excessively there is a risk of the lance-shaped locking piece 14 (engagement arm) becoming damaged.

In view of the above circumstances, an object of the present invention is to provide a connector that enables the thickness of the portion on the connection end portion side of the housing to be reduced in accordance with a constraint imposed by the partner connection target, enables an improvement in the contact holding force for holding the contact in the housing, and enables preventing damage to the engagement arm for engaging with the contact.

(1) A connector according to one aspect of the present invention for solving the aforementioned problems is a connector to be connected to a partner connection target, the connector including: a contact configured to be connected to an electrical wire; and a housing configured to receive insertion of the contact and hold the contact, wherein the contact is provided with an engaging portion configured to engage with the housing when inserted into the housing, the housing is provided with: an insertion end portion configured to receive insertion of the contact; a connection end portion configured to be connected to the partner connection target; a contact insertion hole extending through the housing from the insertion end portion to the connection end portion and configured to receive insertion of the contact; and an engagement arm extending in a cantilevered manner from a connection end portion side toward the insertion end portion and configured to engage with the contact inserted into the contact insertion hole, the engagement arm includes: an engaged portion located at an intermediate position in the engagement arm extending in a cantilevered manner from the connection end portion side toward the insertion end portion, the engaged portion being configured to engage with the engaging portion; and an extension arm portion as a tip-side portion of the engagement arm extending in a cantilevered manner, the extension arm portion extending from the engaged portion toward the insertion end portion, the housing includes an inner wall defining the contact insertion hole, the extension arm portion extends along the inner wall while facing the inner wall with a space therebetween, and the extension arm portion is configured to restrict a flexing amount of the engagement arm by a tip side of the extension arm portion abutting against the inner wall in a case where the engagement arm elastically deforms and flexes due to the contact be biased toward the insertion end portion and the engaging portion biasing the engaged portion.

According to this configuration, the engagement arm, which engages with the contact inserted into the contact insertion hole, extends in a cantilevered manner from the connection end portion side of the housing toward the insertion end portion. Accordingly, the tip-side portion of the engagement arm extending in a cantilevered manner is arranged extending on the insertion end portion side of the housing. For this reason, the tip-side portion of the engagement arm extending in a cantilevered manner is housed inside the portion on the insertion end portion side of the housing and protected from the outside. Accordingly, it is possible to meet a requirement to reduce the thickness of the portion on the connection end portion side of the housing due to a constraint in terms of the structure of the partner connection target to which the connector is to be connected. In other words, according to the above configuration, it is possible to realize the connector that enables reducing the thickness of the portion on the connection end portion side of the housing in accordance with a constraint imposed by the partner connection target.

Also, according to the present embodiment, the engaged portion, which is provided at intermediate position in the cantilever extending direction, of the engagement arm engages with the engaging portion of the contact, and the extension arm portion, which is the tip-side portion of the engagement arm, extends from the engaged portion toward the insertion end portion. Also, the extension arm portion is arranged facing the inner wall of the housing, which defines the contact insertion hole, with a space therebetween, and extends along the inner wall, and furthermore, when the contact is biased toward the insertion end portion and the engagement arm flexes, the tip side of the extension arm portion abuts against the inner wall of the housing, which defines the contact insertion hole, thus restricting the flexing amount of the engagement arm. For this reason, if the contact engaged with the engagement arm is biased in a direction of coming out of the housing, that is to say if the contact is biased toward the insertion end portion of the housing, the engagement arm flexes, and the extension arm portion on the tip side of the engagement arm abuts against the inner wall of the housing, thus restricting the flexing amount of the engagement arm. Since the flexing amount of the engagement arm is restricted due to the extension arm portion abutting against the inner wall of the housing, it is possible to prevent disengagement of the engaging portion of the contact and the engaged portion of the engagement arm, and prevent the contact from coining out of the housing. Accordingly, the contact holding force for holding the contact in the housing can be improved. Also, according to the above configuration, if the contact engaged with the engagement arm is biased in the direction of withdrawal from the housing, that is to say if the contact is biased toward the insertion end portion of the housing, the engagement arm flexes, and the extension arm portion abuts against the inner wall of the housing, thus restricting the flexing amount of the engagement arm. For this reason, it is possible to prevent excessive flexing of the engagement arm, and prevent the engagement arm from becoming damaged.

Therefore, according to the above configuration, it is possible to provide the connector that enables reducing the thickness of the portion on the connection end portion side of the housing in accordance with a constraint imposed by the partner connection target, enables improving the contact holding force for holding the contact in the housing, and enables preventing damage to the engagement arm that engages with the contact.

(2) A configuration is possible in which the engagement arm extending in a cantilevered manner from the connection end portion side of the housing toward the insertion end portion includes a base-side portion that is exposed to an outside of the housing and constitutes a portion of a wall portion of the housing.

According to this configuration, the base-side portion of the engagement arm, which extends in a cantilevered manner from the connection end portion side of the housing toward the insertion end portion, constitutes a portion of the wall portion of the housing that is exposed to the outside. For this reason, the base-side portion of the engagement arm arranged on the connection end portion side of the housing can also serve as a portion of the wall portion on the connection end portion side of the housing, thus making it possible to further reduce the thickness of the portion on the connection end portion side of the housing.

(3) A configuration is possible in which the extension arm portion is provided with an inclined surface extending obliquely relative to a direction from the connection end portion side toward the insertion end portion, and the inclined surface approaches the inner wall faced by the extension arm portion while extending toward the insertion end portion.

According to this configuration, the extension arm portion on the tip side of the engagement arm, which extends toward the insertion end portion, is provided with the inclined surface that approaches the inner wall of the housing, which defines the contact insertion hole, while extending toward the insertion end portion. For this reason, when the contact is inserted into the contact insertion hole from the insertion end portion side, the contact smoothly moves along the inclined surface of the extension arm portion while sliding on the inclined surface. Then, when the engaging portion of the contact passes the inclined surface of the extension arm portion and further rides over and passes the engaged portion of the engagement arm, the engaging portion and the engaged portion engage with each other, and the contact is held. Therefore, according to the above configuration, when the contact is inserted into the contact insertion hole, the engagement arm and the contact can smoothly engage with each other.

(4) A configuration is possible in which the extension arm portion is configured to restrict the flexing amount of the engagement arm by the tip side of the extension arm portion abutting against the inner wall in a case where the engagement arm elastically deforms and flexes due to the electrical wire connected to the contact inserted in the contact insertion hole being subjected to an external force acting in a direction of pulling the contact toward the insertion end portion.

According to this configuration, when the electrical wire connected to the contact is subjected to an external force acting in a direction of pulling the electrical wire out of the connector, the engagement arm flexes, and the tip side of the extension arm portion abuts against the inner wall of the housing, which defines the contact insertion hole, thus restricting the flexing amount of the engagement arm. Accordingly if the electrical wire is subjected to an external force acting in the withdrawal direction, the engaging portion of the contact and the engaged portion of the engagement arm are prevented from becoming disengaged, and the contact is prevented from being removed from the housing. Accordingly, the contact holding force for holding the contact in the housing can be improved when the electrical wire is subjected to an external force acting in the withdrawal direction. Furthermore, when the electrical wire is subjected to an external force acting in the withdrawal direction, the engagement arm can be prevented from flexing excessively, and the engagement arm can be prevented from becoming damaged.

The above and other objects, features, and advantages of the present invention will become apparent from reading the following description together with the accompanying drawings.

BRIEF DESCRIPTION OF THE DRAWINGS

FIG. 5A is a front view of the contact, FIG. 5B is a side view of the contact, and FIG. 5C is a bottom view of the contact.

FIG. 13A is a diagram showing a state before the contact is inserted into the contact insertion hole, FIG. 13B is a diagram showing a state in which the contact is being inserted into the contact insertion hole, and FIG. 13C is a diagram showing a state in which the contact has been inserted into the contact insertion hole.

FIG. 15A is a diagram showing a state in which a contact removing jig has been inserted into the contact insertion hole, and FIG. 15B is a diagram showing a state in which the contact removing jig is in contact with the engagement arm of the housing.

FIG. 18A is a diagram showing a state before the contact removing jig is inserted into a jig hole provided in the engagement arm of a housing, and FIG. 18B is a diagram showing a state in which the contact removing jig has been inserted into the jig hole of the engagement arm.

DETAILED DESCRIPTION OF THE INVENTION

Hereinafter, embodiments for carrying out the present invention will be described with references to the drawings. The present invention is broadly applicable to various applications as a connector that is for connection to a partner connection target and includes a contact, which is for connection to an electrical wire, and a housing for receiving insertion of the contact and holding the contact.

Overview of Configuration of Connector

Figure 1:
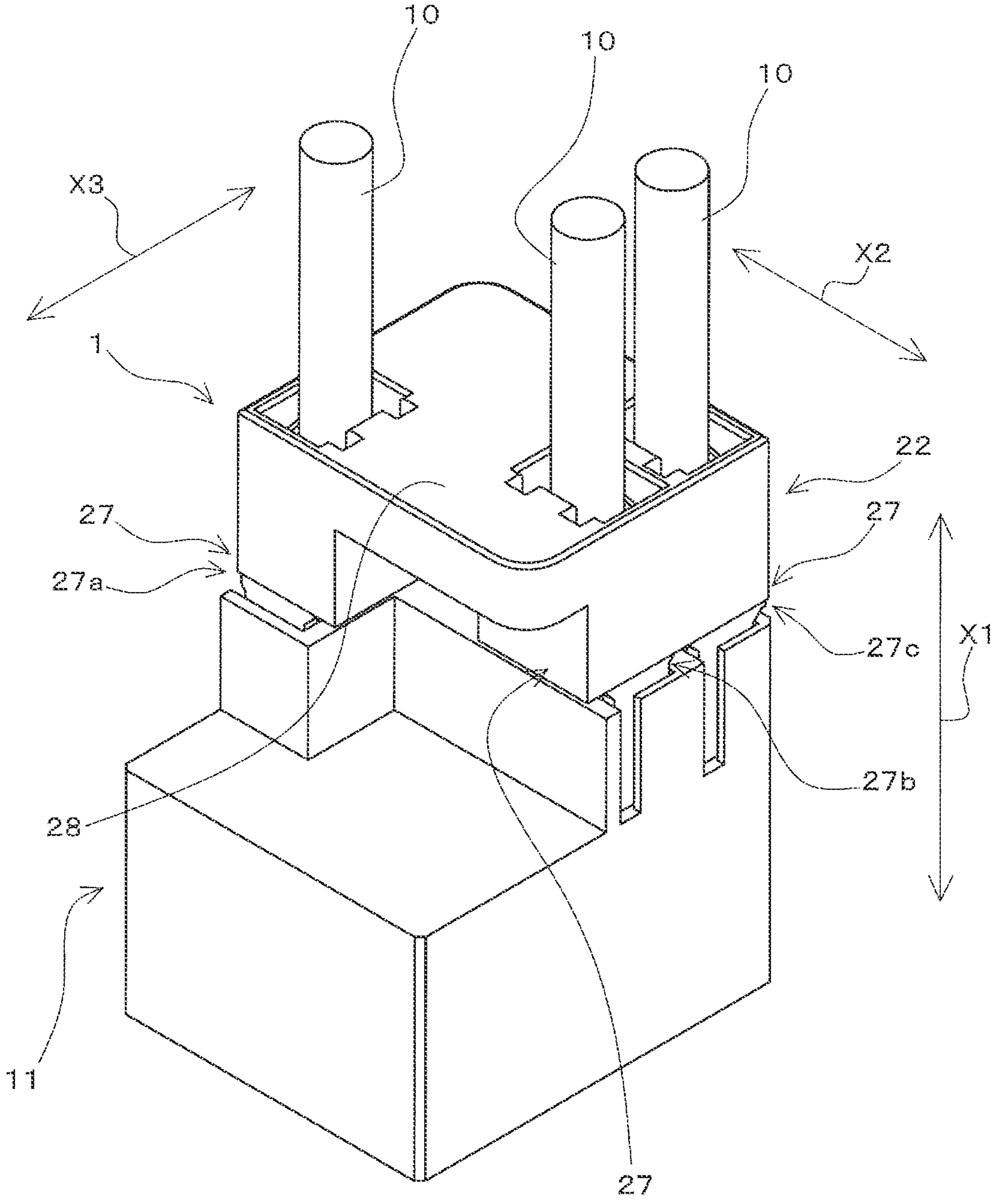
FIG. 1 is a perspective view showing a state in which a connector according to an embodiment of the present invention has been connected to a terminal block that is a partner connection target.
Figure 2:
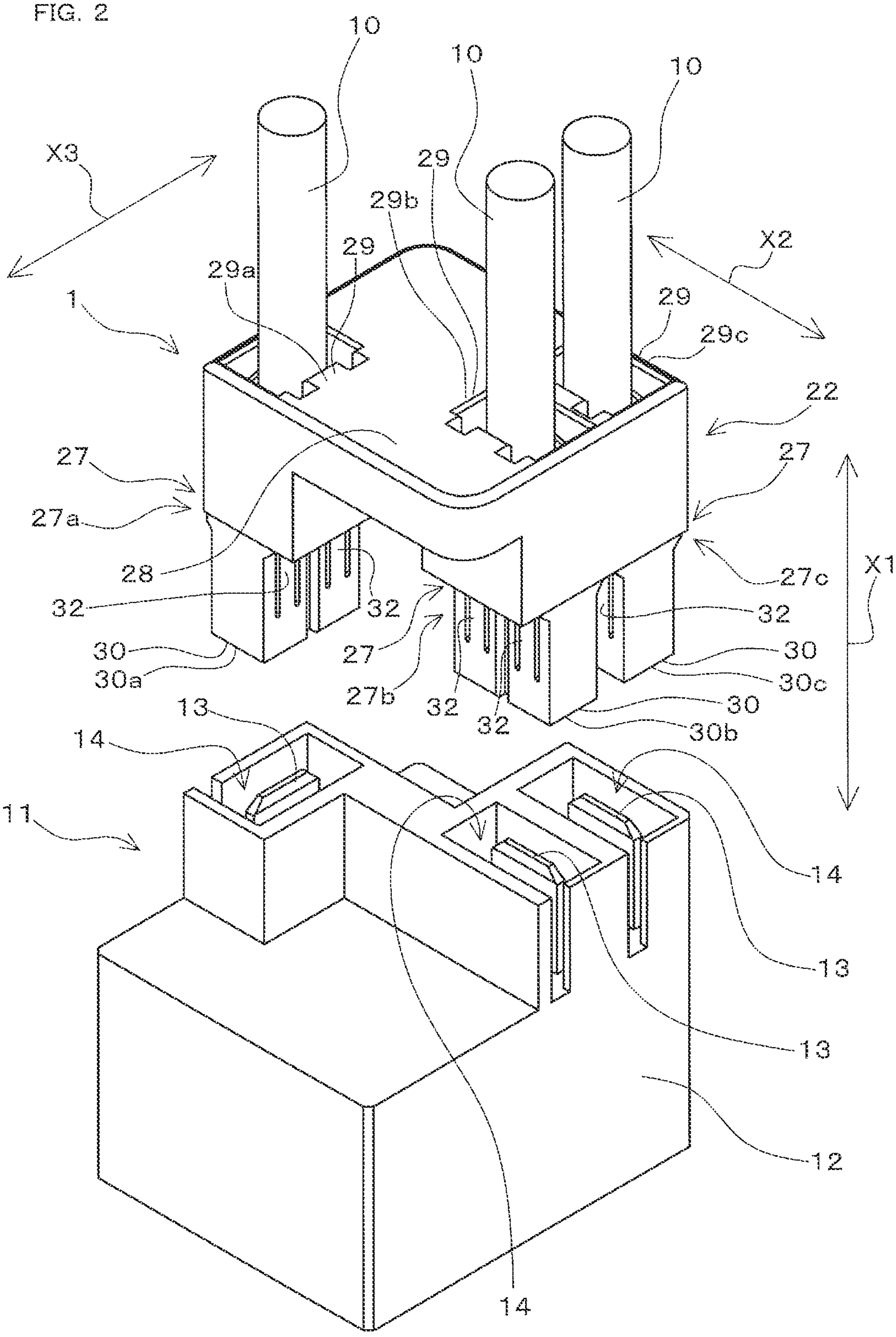
FIG. 2 is a perspective view showing a state before the connector and terminal block are connected.
Figure 3:
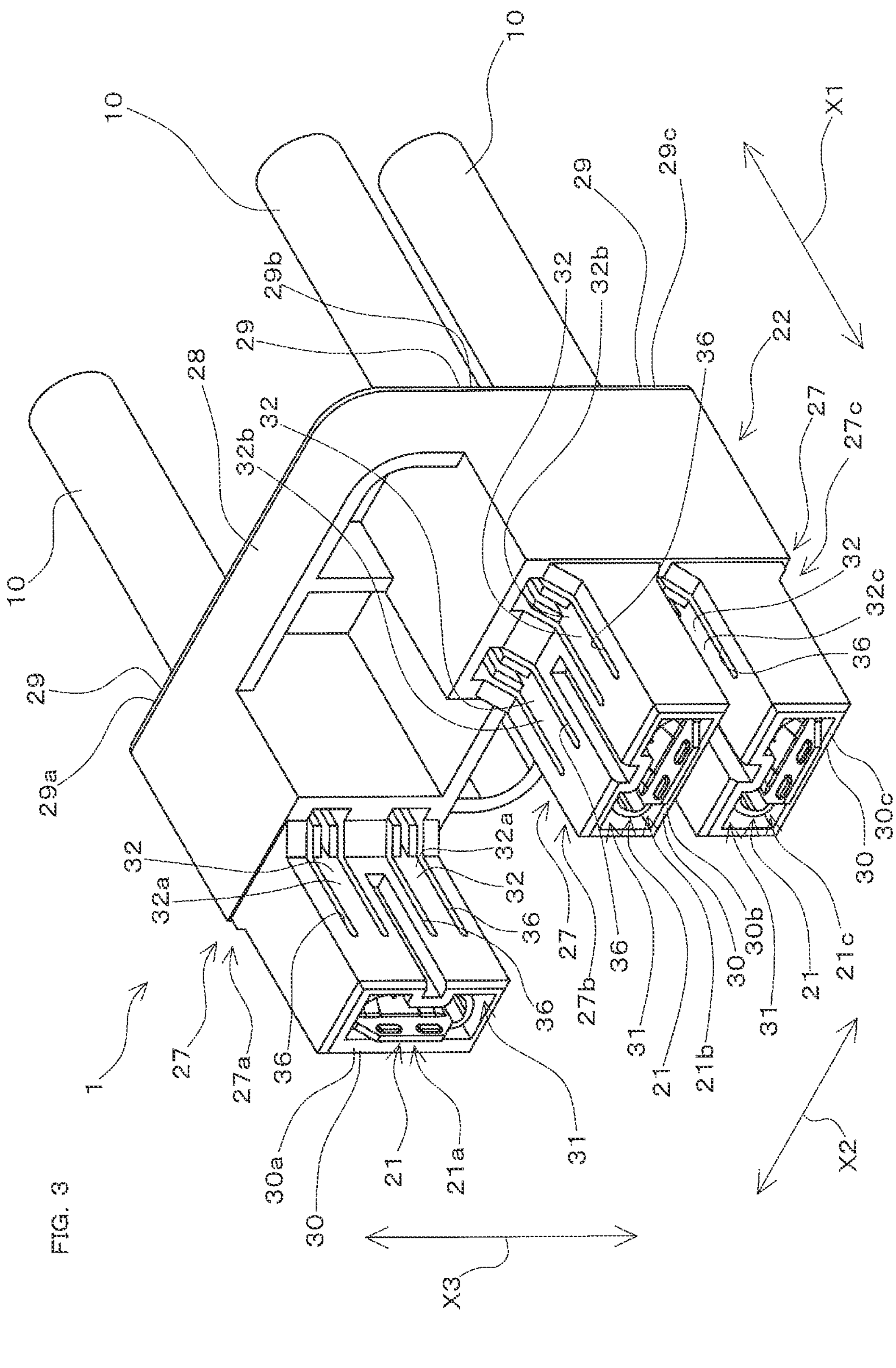
FIG. 3 is a perspective view of the connector.
Figure 4:
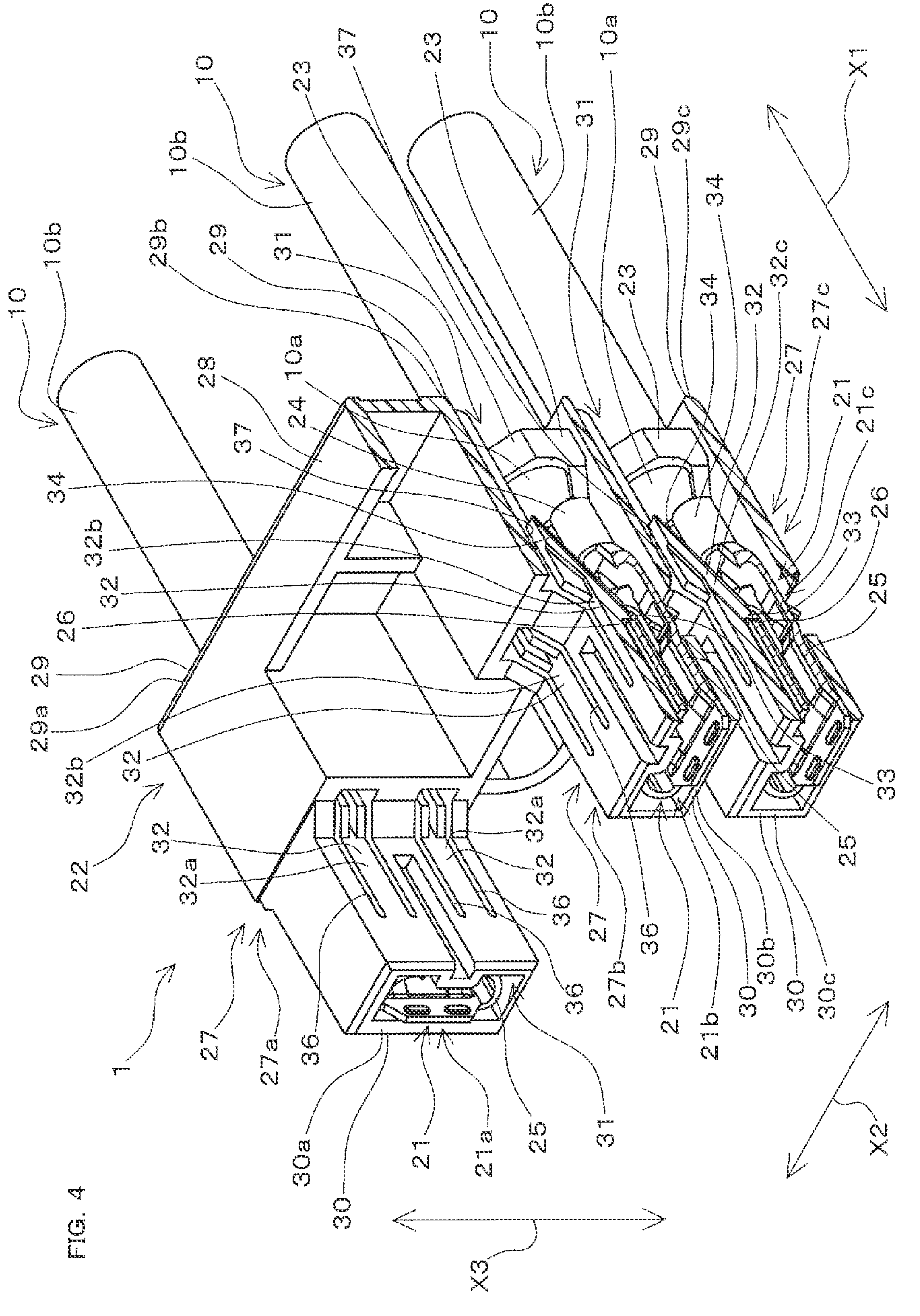
FIG. 4 is a perspective view of the connector and includes a partial cross-section.

FIG. 1 is a perspective view showing a state in which a connector 1 according to an embodiment of the present invention has beery connected to a terminal block 11, which is a partner connection target. FIG. 2 is a perspective view showing a state before the connector 1 and the terminal block 11 are connected to each other. FIG. 3 is a perspective view of the connector 1. FIG. 4 is a perspective view of the connector 1 and includes a partial cross-section. Note that FIGS. 1 to 4 show a state in which an electrical wire 10 is connected to the connector 1, and in FIGS. 1 to 4, the portion of the electrical wire 10 connected to the connector 1 is shown schematically.

The connector 1 shown in FIGS. 1 to 4 includes a plurality of contacts 21 and a housing 22 that holds the contacts 21. The contacts 21 are for connection to a plurality of electrical wires 10. Each of the contacts 21 is inserted into the housing 22 and held by the housing 22. In the present embodiment, a mode is shown in which the connector 1 includes three contacts 21 as the plurality of contacts 21 held in the housing 22. Note that the number of contacts 21 provided in the connector 1 is not limited to three, and may be any of various numbers.

The connector 1 is connected to the electrical wires 10 by connection of the electrical wires 10 to the contacts 21. By connecting the electrical wires 10 to the connector 1, and then connecting the connector 1 to the terminal block 11, which is the partner connection target, the electrical wires 10 are thus electrically connected to the terminal block 11.

The terminal block 11, which is the partner connection target of the connector 1, is for attachment to a substrate (not shown), for example. By connecting the connector 1, which is connected to the electrical wires 10, to the terminal block 11, the electrical wires 10 and the substrate (not shown) are thus electrically connected. The terminal block 11 includes a partner housing 12 and a plurality of partner contacts 13 held in the partner housing 12.

The partner housing 12 is configured to be connected to the housing 22 of the connector 1 by being fitted together with the housing 22. The partner housing 12 is provided with a plurality of fitting holes 14. The fitting holes 14 are configured to be respectively fitted to portions of later-described contact holding portions 27 of the housing 22, specifically portions on a connection end portion 30 side. By the portions on the connection end portion 30 side of the later-described contact holding portions 27 of the housing 22 being respectively fitted to the fitting holes 14, the housing 22 and the partner housing 12 are fitted together and thus connected.

The partner contacts 13 are configured to be respectively electrically connected to the contacts 21 of the connector 1. The partner contacts 13 are held by the partner housing 12 and arranged inside the fitting holes 14. By the housing 22 of the connector 1 being fitted to and connected to the partner housing 12 of the terminal block 11, the contacts 21 of the connector 1 respectively come into contact with, and are electrically connected to, the partner contacts 13 of the terminal block 11.

Note that in the present embodiment, a mode is shown in which the terminal block 11 is the partner connection target for the connector 1, but the present invention is not limited to this mode. In other words, the partner connection target for the connector 1 may be an object other than the terminal block 11.

The following is a more detailed description of the configuration of the connector 1. For convenience in the following description, a connection direction X1, a width direction X2, and a front-rear direction X3 of the connector 1 are defined as indicated by double-headed arrows X1 to X3, respectively, in FIGS. 1 to 4 and the drawings described later. The connection direction X1 is a direction parallel with the direction in which the connector 1 and the terminal block 11 are fitted together and connected. The width direction X2 and the front-rear direction X3 are directions perpendicular to the connection direction X1, and furthermore, the width direction X2 and the front-rear direction X3 are perpendicular to each other. Note that in the present embodiment, a mode is shown in which the length of the connector 1 in the width direction X2 is slightly longer than the length of the connector 1 in the front-rear direction X3.

Contacts

Figure 5A:
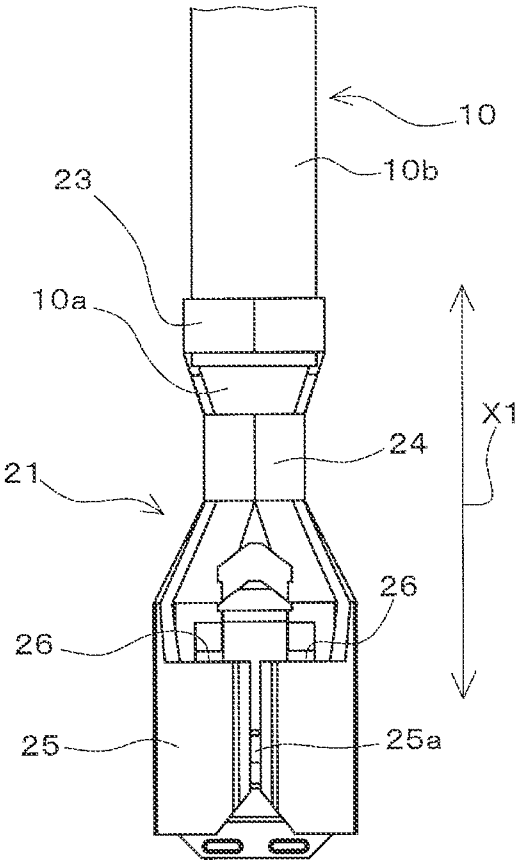
FIGS. 5A, 5B, and 5C are diagrams showing the contact in a state of being connected to an electrical wire, where
Figure 5B:
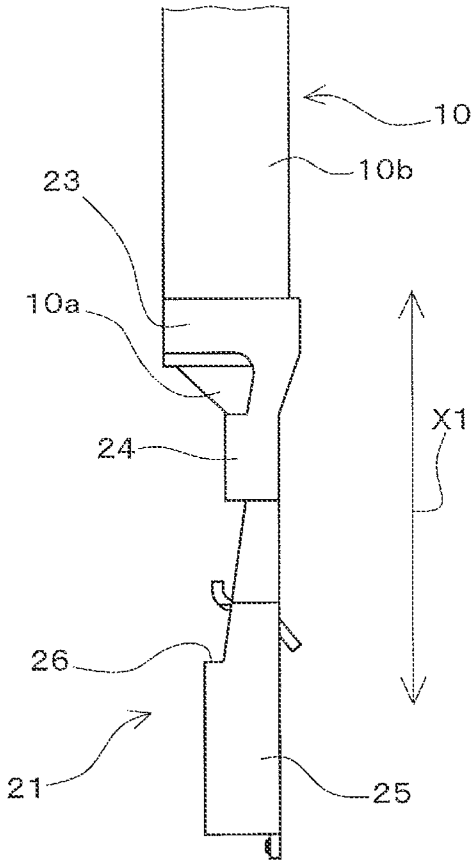
Figure 5C:
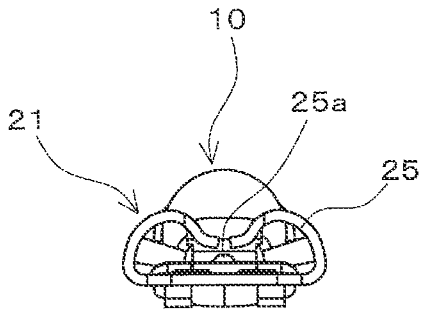
Figure 6:
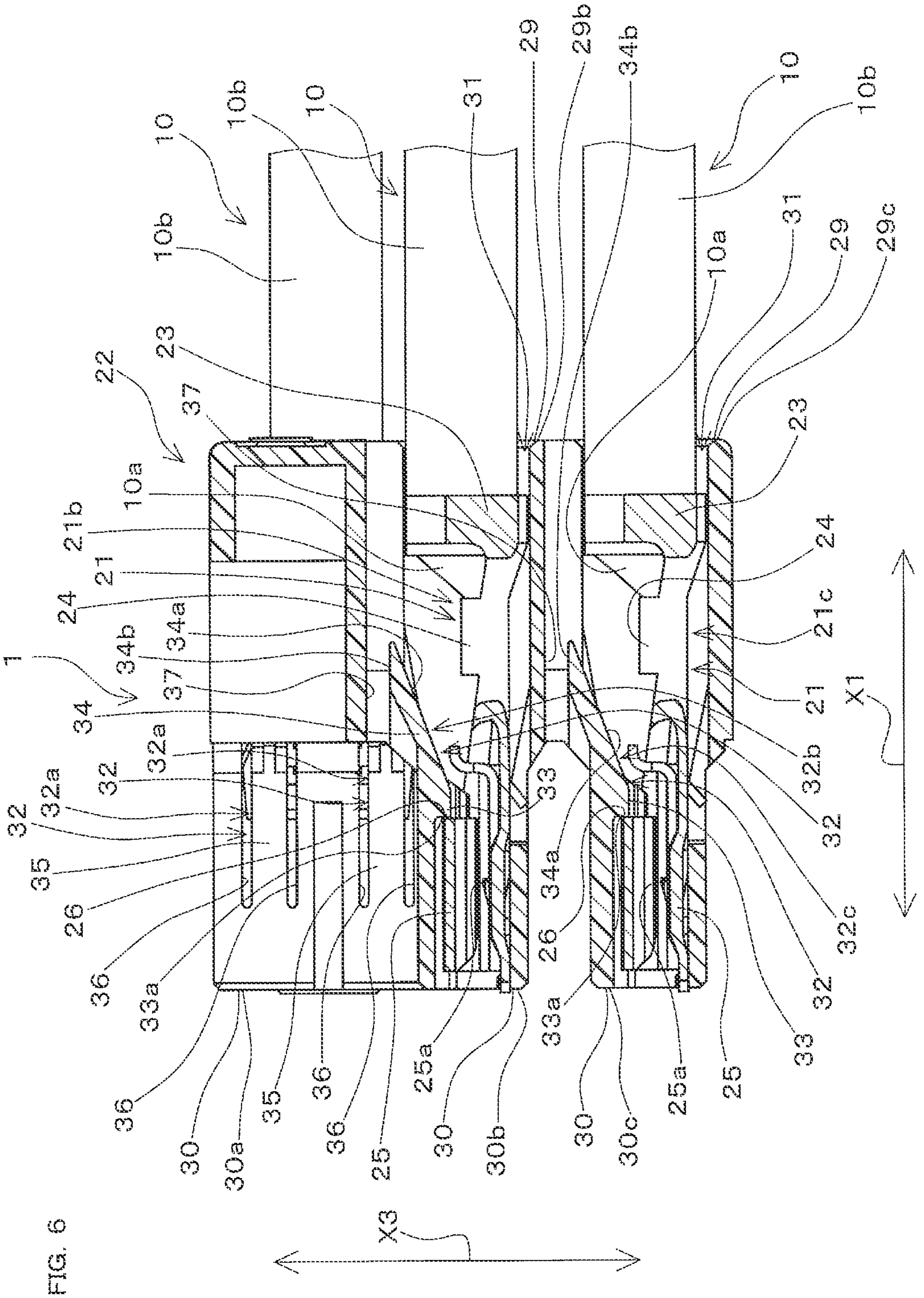
FIG. 6 is a cross-sectional view of the connector taken along a connection direction, which is the direction in which the connector and the terminal block are connected to each other.
Figure 7:
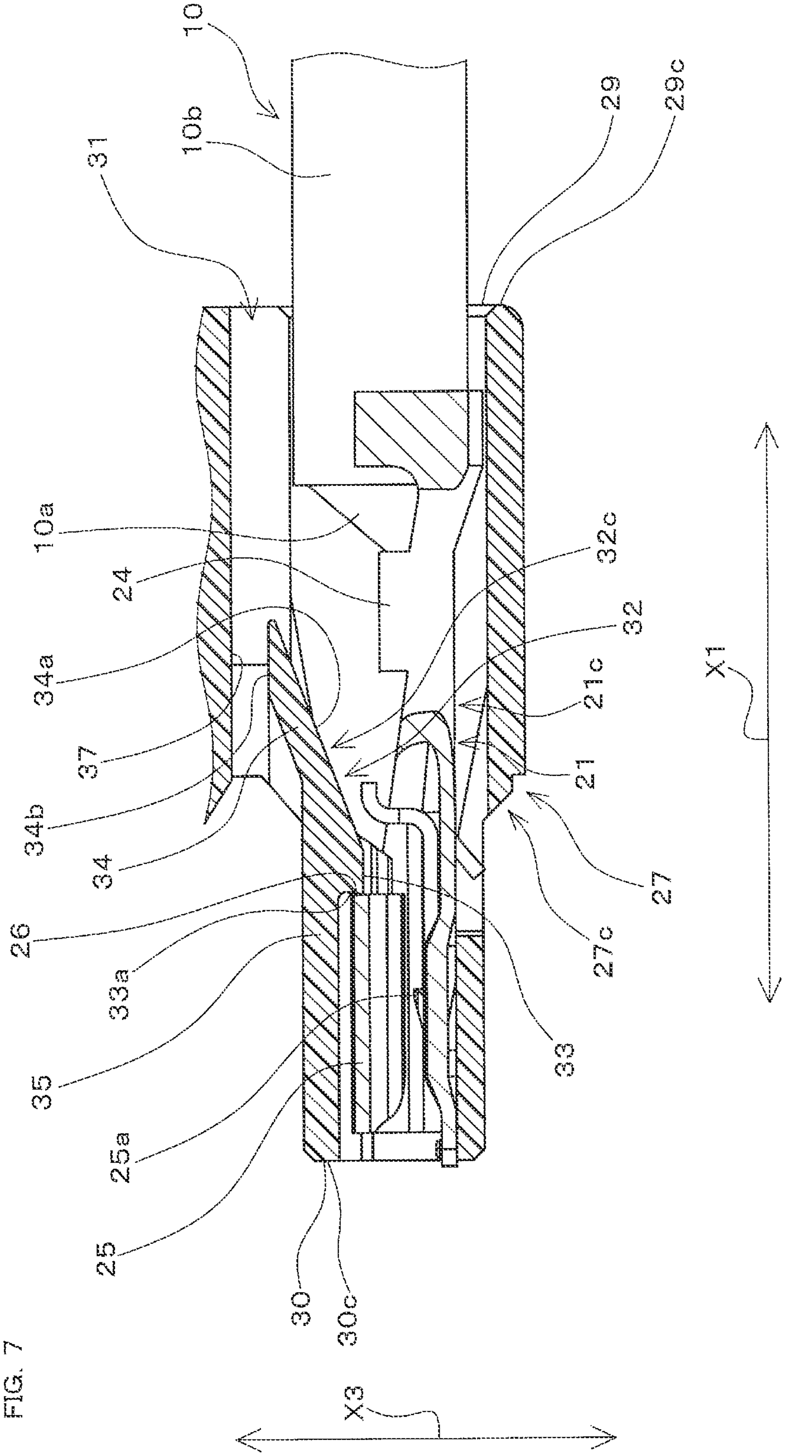
FIG. 7 is a partially enlarged cross-sectional view showing an enlarged portion of the cross-section of the connector shown in FIG. 6.

FIGS. 5A, 5B, and 5C are diagrams showing one of the contacts 21 connected to cone of the electrical wires 10, where FIG. 5A is a front view of the contact 21, FIG. 5B is a side view of the contact 21, and FIG. 5C is a bottom view of the contact 21. FIG. 6 is a cross-sectional view of the connector 1 taken along the connection direction X1, which is the direction in which the connector 1 and the terminal block 11 are connected to each other. FIG. 7 is a partially enlarged cross-sectional view showing an enlarged portion of the cross-section of the connector 1 shown in FIG. 6.

As shown in FIGS. 3 to 7, the connector 1 includes a plurality of contacts 21, and in the present embodiment, includes three of such contacts. In the present embodiment, a mode is shown in which a contact 21*a*, a contact 21*b*, and a contact 21*c* are provided as the three contacts 21. The contact 21*a*, the contact 21*b*, and the contact 21*c* serving as the contacts 21 have the same shape. The contacts 21 are each formed using an electrically-conductive metal material, and are configured to be connected to corresponding electrical wires 10 and be inserted into the housing 22 and held by the housing 22. The contacts 21 are held in the housing 22 in a state in which the lengthwise directions of the contacts 21 are parallel with each other and conform to the connection direction X1. Also, the contacts 21 are configured such that when the connector 1 and the terminal block 11 are connected, the contacts 21 come into contact with the partner contacts 13 of the terminal block 11, thus electrically connecting the partner contacts 13 and the electrical wires 10.

Each of the contacts 21 is provided with a wire crimping portion 23, a core wire crimping portion 24, a contact connection portion 25, and an engaging portion 26, and furthermore, the crimping portion 23, the core wire crimping portion 24, the contact connection portion 5, and the engaging portion 26 are integrated with the contact 21. In each of the contacts 21, the wire crimping portion 23, the core wire crimping portion 24, and the contact connection portion 25 are arranged side by side in a straight line in this order, and the lengthwise direction of the contact 21 is defined by the direction in which the wire crimping portion 23, the core wire crimping portion 24, and the contact connection portion 25 are arranged side by side.

The wire crimping portion 23 is provided as the portion on one end side in the lengthwise direction of the contact 21, and is the portion that is to be crimped to the electrical wire 10. Note that the electrical wire 10 includes a core wire 10*a* and an insulating covering 10*b* that surrounds the core wire 10*a*. At the end portion of the electrical wire 10 that is connected to the contact 21, the insulating covering 10*b* is partially removed to expose the core wire 10*a* to the outside. The wire crimping portion 23 is the portion that is to be crimped to the electrical wire 10 by being crimped to the insulating covering 10*b* at the end portion of the electrical wire 10.

The core wire crimping portion 24 is provided as a portion that is to be pressed around and crimped to the core wire 10*a* of the electrical wire 10, and is configured to be crimped to the exposed portion of the core wire 10*a* at the end portion of the electrical wire 10.

The contact connection portion 25 is provided as a portion on the other end side of the contact 21 in the lengthwise direction. In other words, the contact connection portion 25 is provided as a portion of the end portion of the contact 21 on the side opposite to the wire crimping portion 23 in the lengthwise direction. The contact connection portion 25 is provided as a portion that is to be connected to a partner contact 13 of the terminal block 11.

The contact connection portion 25 is provided as a portion formed by bending a flat plate-like portion into a flattened tubular shape. The contact connection portion 25 is configured to be connected to the partner contact 13 of the terminal block 11 by fitting the partner contact 13 into the flattened tubular portion. Also, the contact connection portion 25 is provided with a contact point 25*a* that protrudes so as to be in constant contact with the connected partner contact 13 inside the flattened tubular portion.

The engaging portion 26 is provided as a portion that engages with the housing 22 when the contact 21 is inserted into the housing 22, and in the present embodiment, the engaging portion 26 is an edge portion of the contact connection portion 25, that is to say the edge portion of the contact connection portion 25 on one side in the lengthwise direction of the contact 21. More specifically, the engaging portion 26 is provided as an edge portion of the contact connection portion 25 on the wire crimping portion 23 side in the lengthwise direction of the contact 21. Note that the engaging portion 26 provided as the edge portion of the contact connection portion 25 on the wire crimping portion 23 side is a portion that is cut out so as to be recessed as a step from the contact connection portion 25 side toward the wire crimping portion 23, and is configured to be easily engaged with the housing 22. The engaging portion 26 is configured to engage with the housing 22 at an engaged portion 33 of the later-described engagement arm 32.

Housing

Figure 8:
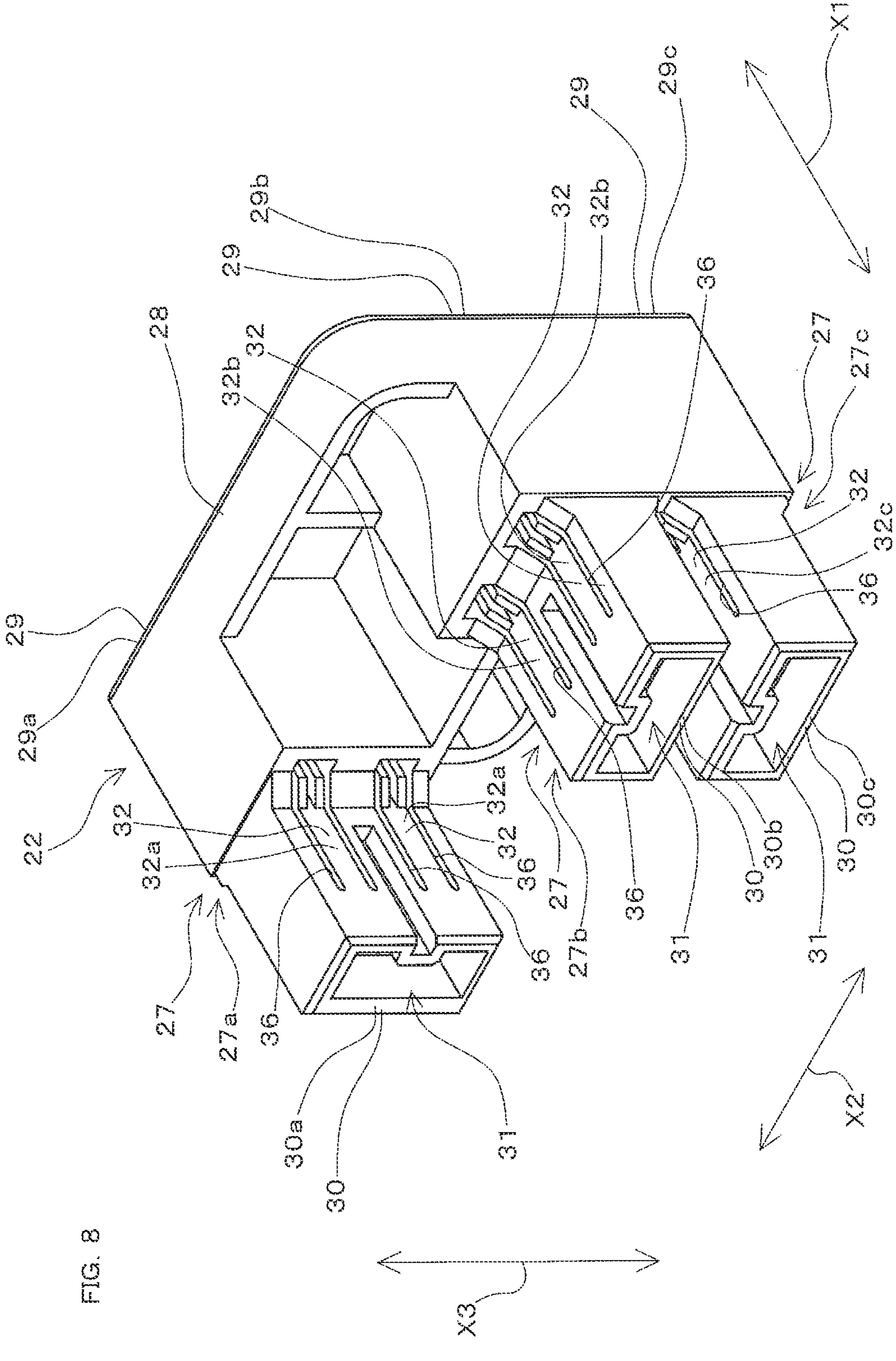
FIG. 8 is a perspective view of a housing of the connector.
Figure 9:
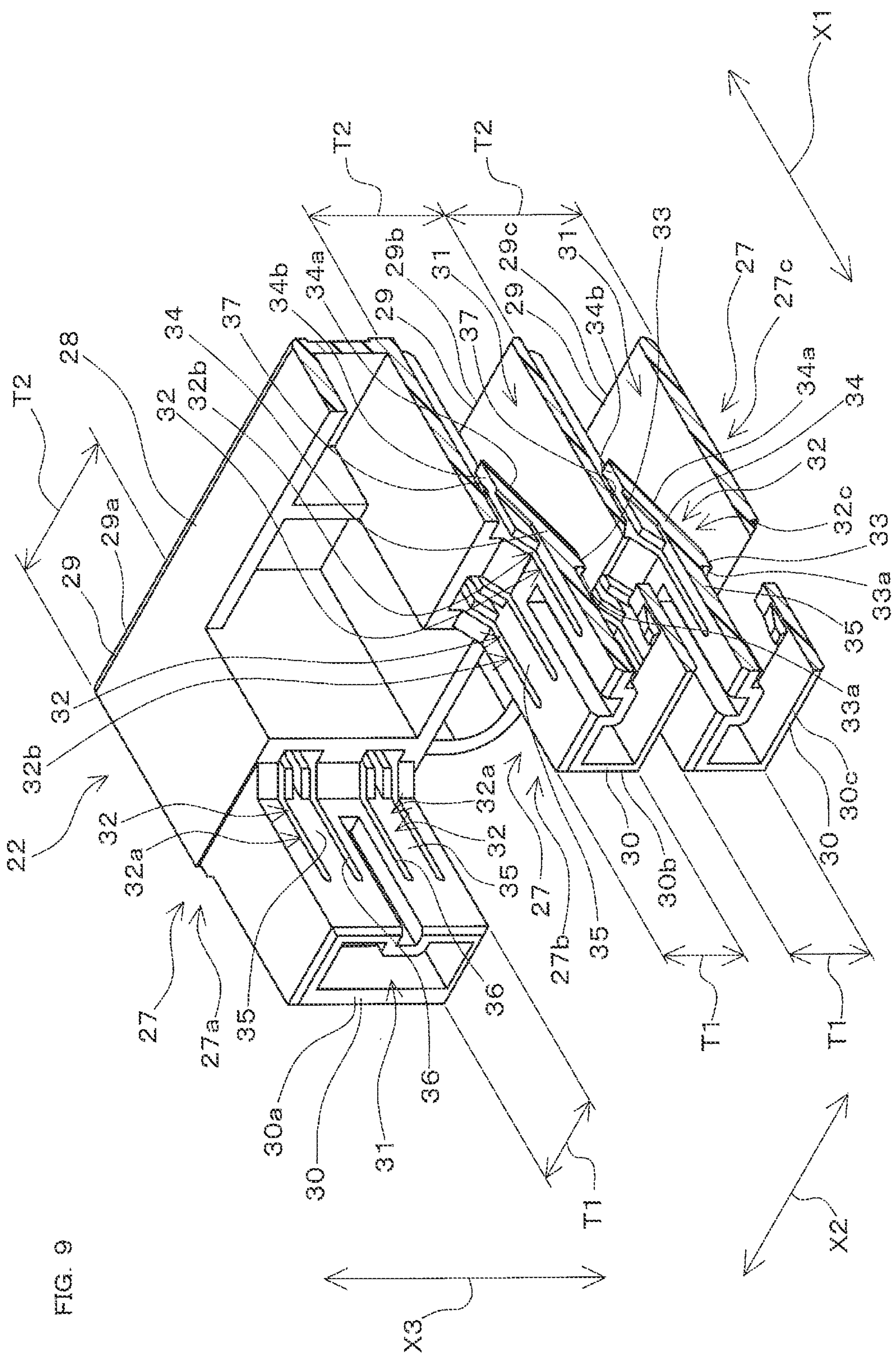
FIG. 9 is a perspective view of the housing of the connector; and includes a partial cross-section.
Figure 10:
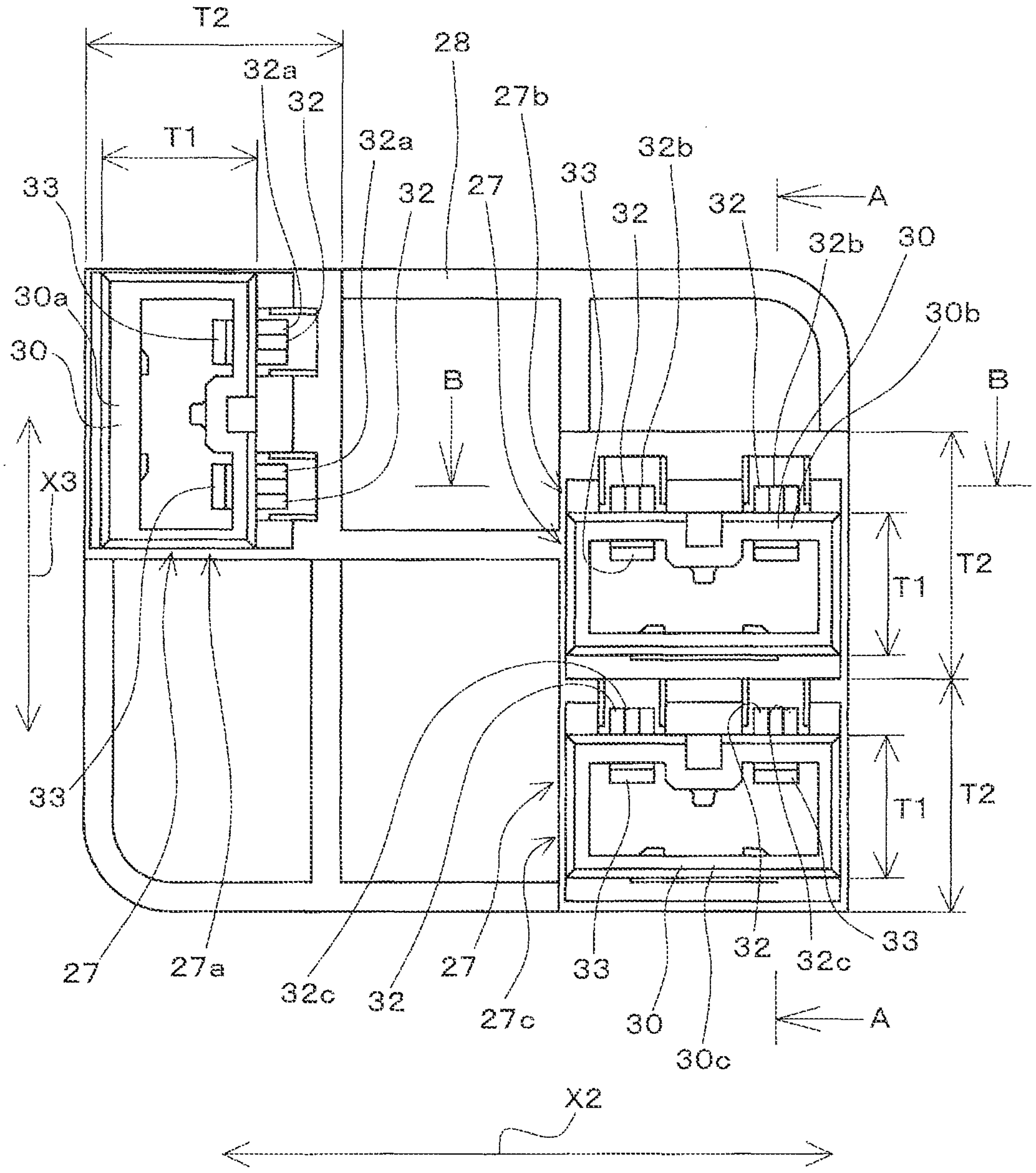
FIG. 10 is a view of the housing of the connector as viewed frons the end portion on one side in the connection direction.
Figure 11:
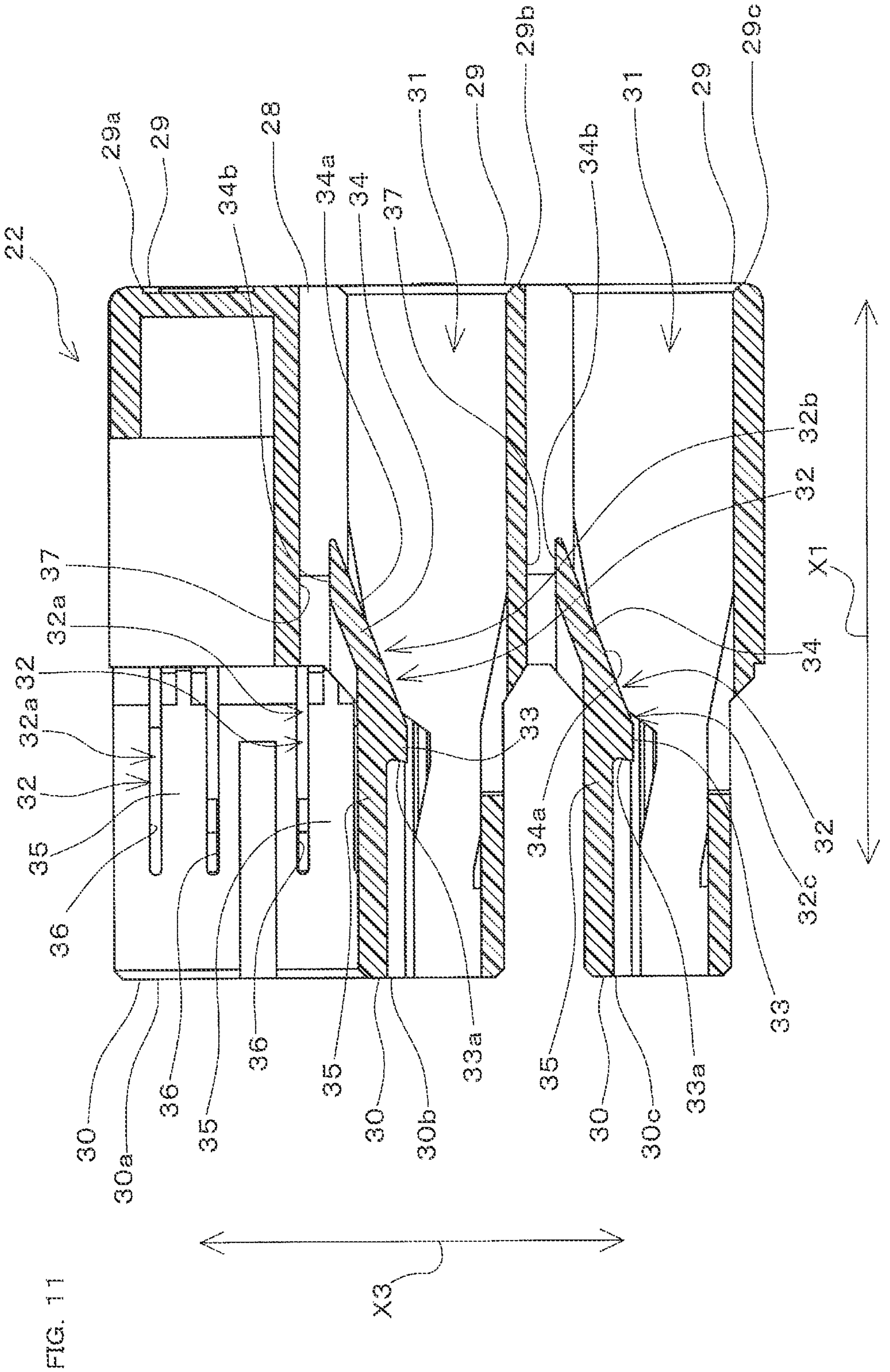
FIG. 11 is a cross-sectional view of the housing of the connector taken along a line A-A in FIG. 10.
Figure 12:
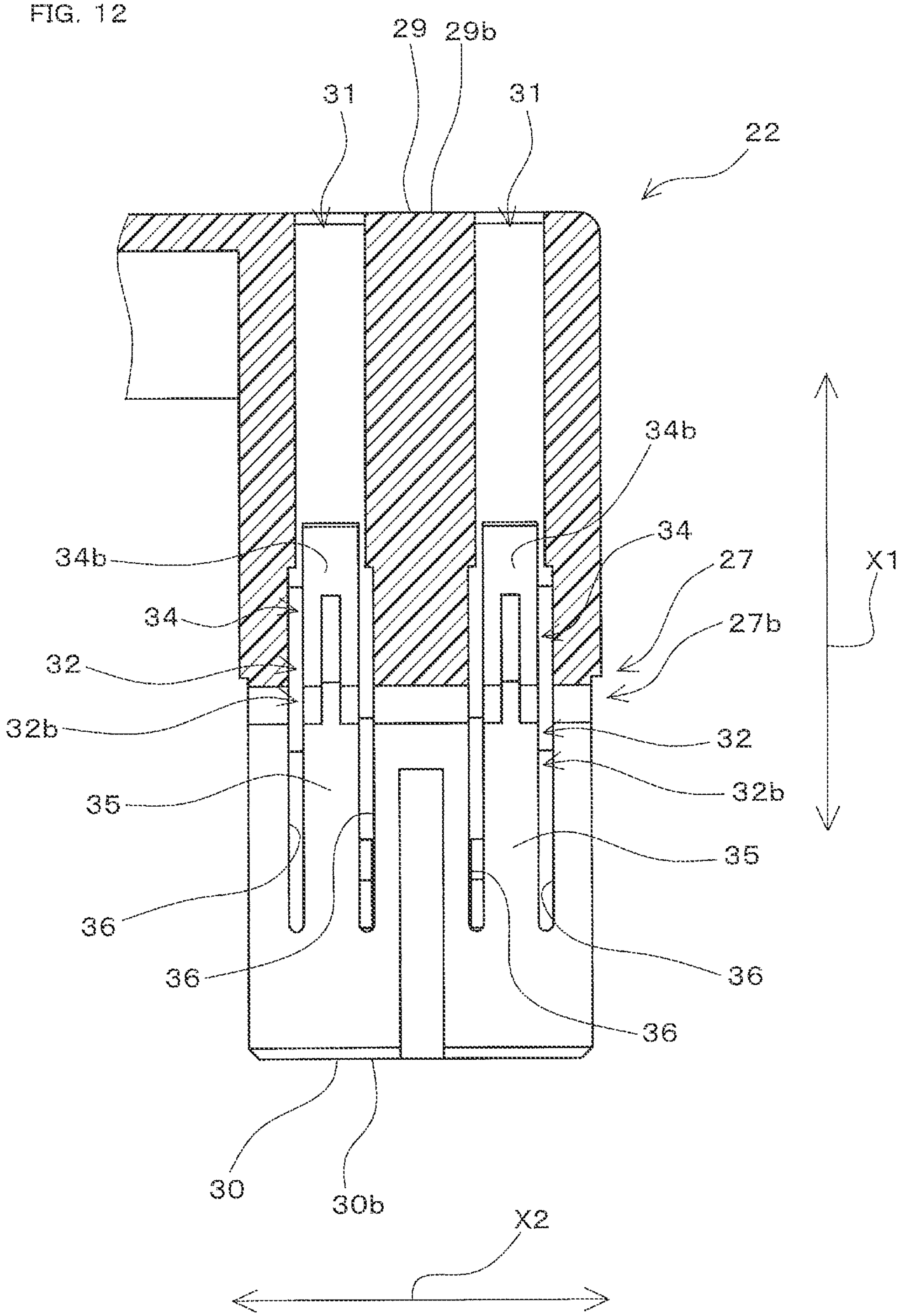
FIG. 12 is a cross-sectional view of the housing of the connector taken along a line B-B in FIG. 10.

FIG. 8 is a perspective view of the housing 22 of the connector 1. FIG. 9 is a perspective view of the housing 22, and includes a partial cross-section. FIG. 10 is a view of the housing of the connector 22 as viewed from the end portion on one side in the connection direction X1. FIG. 11 is a cross-sectional view of the housing 22 taken along a line A-A in FIG. 10. FIG. 12 is a cross-sectional view of the housing 22 taken along a line B-B in FIG. 10.

As shown in FIGS. 1 to 4 and 6 to 12, the housing 22 is configured to receive insertion of the contacts 21 and hold the contacts 21, and also be connected to the partner housing 12 of the terminal block 11. The housing 22 is formed using an insulating resin material. The housing 22 includes a plurality of contact holding portions 27 for respectively holding the contacts 21, and a base portion 28 integrally joins the contact holding portions 27.

The contact holding portions 27 are each provided as a portion that extends with a rectangular tube shape along the connection direction X1, and are provided so as to extend parallel with each other along the connection direction X1. The contact holding portions 27 are each configured to hold one of the contacts 21. Note that in the connector 1 of the present embodiment, three contact holding portions 27 are provided in accordance with the number of contacts 21. Specifically in the housing 22 of the present embodiment, a contact holding portion 27*a*, a contact holding portion 27*b*, and a contact holding portion 27*c* are provided as the contact holding portions 27. The contact holding portion 27*a* holds the contact 21*a*, the contact holding portion 27*b* holds the contact 21*b*, and the contact holding portion 27*c* holds the contact 21*c*.

The contact holding portion 27*a* is configured to receive insertion of the contact 21*a* from one end side in the connection direction X1, and hold the contact 21*a*. On the other end side in the connection direction X1, the contact holding portion 27*a* is configured to be fitted into one fitting hole 14 among the plurality of fitting holes 14 provided in the partner housing 12 of the terminal block 11, and thus be connected to the partner housing 12. Also, the contact holding portion 27*b* is configured to receive insertion of the contact 21*b* from one end side in the connection direction X1, and hold the contact 21*b*. On the other end side in the connection direction X1, the contact holding portion 27*b* is configured to be fitted into one fitting hole 14 among the plurality of fitting holes 14 provided in the partner housing 12 of the terminal block 11, and thus be connected to the partner housing 12. Moreover, the contact holding portion 27*c* is configured to receive insertion of the contact 21*c* from one end side in the connection direction X1, and hold the contact 21*c*. On the other end side in the connection direction X1, the contact holding portion 27*c* is configured to be fitted into one fitting hole 14 among the plurality of fitting holes 14 provided in the partner housing 12 of the terminal block 11, and thus be connected to the partner housing 12.

The contact holding portion 27*a*, the contact holding portion 27*b*, and the contact holding portion 27*c* are provided at different positions in the housing 22. In the present embodiment, in the housing 22, the contact holding portion 27*a* is provided on one end side in the width direction X2, and the contact holding portion 27*b* and the contact holding portion 27*c* are provided on the other end side in the width direction X2. Also, the contact holding portion 27*b* and the contact holding portion 27*c* are arranged side by side along the front-rear direction X3.

The base portion 28 is provided with a plurality of contact holding portions 27 that have a rectangular tubular shape and extend parallel with each other in the connection direction X1, as portions that are integrally joined to each other on one end side in the connection direction X1, which is the side on which the contacts 21 are inserted. Specifically, the base portion 28 is provided with a contact holding portion 27*a*, a contact holding portion 27*b*, and a contact holding portion 27*c* that have a rectangular tubular shape and extend parallel with each other in the connection direction X1, as portions that are integrally joined to each other on the one end side in the connection direction X1. Also, the base portion 28 extends in the width direction X2 and the front-rear direction X3, and integrally joins one end portion of the contact holding portions 27*a*, one end portion of the contact holding portion 27*b*, and one end portion of the contact holding portion 27*c*.

The following is a more detailed description of the configuration of the housing 22. The housing 22 is provided with insertion end portions 29 as end portions into which the contacts 21 are inserted, connection end portions 30 as end portions for connection to the terminal block 11 that is the partner connection target for the connector 1, contact insertion holes 31 that receive insertion of the contacts 21, and engagement arms 32 that engage with the contacts 21.

The insertion end portions 29 of the housing 22 are configured as the end portions that receive insertion of the contacts 21 in the housing 22, and are provided as the end portions of the housing 22 on the base portion 28 side in the connection direction X1. The insertion end portions 29 of the housing 22 are configured as the end portions that receive insertion of the contacts 21 in the contact holding portions 27 of the housing 22. In other words, the insertion end portions 29 of the housing 22 are constituted by the insertion end portions 29 of the contact holding portions 27, which are the end portions of the contact holding portions 27 that receive insertion of the contacts 21. Also, in the present embodiment, each of the contact holding portions 27 (27*a*, 27*b*, 27*e*) is provided with the insertion end portion 29, which is an end portion that receives insertion of a contact 21. More specifically, an insertion end portion 29*a* is provided as the insertion end portion 29 of the contact holding portion 27*a*, an insertion end portion 29*b* is provided as the insertion end portion 29 of the contact holding portion 27*b*, and an insertion end portion 29*c* is provided as the insertion end portion 29 of the contact holding portion 27*c*.

The connection end portions 30 of the housing 22 are configured as end poi ions for connection to the partner housing 12 of the terminal block 11, in the housing 22, and are provided as end portions on the side opposite to the base portion 28 side in the connection direction X1 of the housing 22. The connection end portions 30 of the housing 22 are configured as end portions for connection to the partner housing 12 of the terminal block 11, in the contact holding portion 27 of the housing 22. In other words, the connection end portions 30 of the housing 22 are constituted by the connection end portions 30 of the contact holding portion 27, which are end portions of the contact holding portions 27 for connection to the partner housing 12 by fitting to the fitting holes 14 of the partner housing 12 of the terminal block 11. Also, in the present embodiment, each of the contact holding portions 27 (27*a*, 27*b*, 27*c* is provided with the connection end portion 30, which is an end portion for connection to the partner housing 12 of the terminal block 11 by fitting to one of the fitting holes 14 of the partner housing 12. More specifically a connection end portion 30*a* is provided as the connection end portion 30 of the contact holding portion 27*a*, a connection end portion 30*b* is provided as the connection end portion 30 of the contact holding portion 27*b*, and a connection end portion 30*c* is provided as the connection end portion 30 of the contact holding portion 27*c*.

As described above, the housing 22 has a configuration in which the contact holding portion 27*a*, the contact folding portion 27*b*, and the contact holding portion 27*c* are integrally joined on the insertion end portion 29 (29*a*, 29*b*, 29*c*) side by the base portion 28. Also, in the housing 22, the portions of the contact holding portion 27*a*, the contact holding portion 27*b*, and the contact holding portion 27*c* on the connection end portion 30 (30*a*, 30*b*, 30*c*) side project along the connection direction X1 from the base portion 28 side.

As shown in FIGS. 3, 4, and 6 to 12, the contact insertion holes 31 are provided as holes that extend through the housing 22 from the insertion end portions 29 to the connection end portions 30, and are holes for receiving insertion of the contacts 21. A plurality of contact insertion holes 31 are provided in the housing 22, and in the present embodiment, three contact insertion holes 31 are provided in accordance with the number of contacts 21 of the connector 1. The contact insertion holes 31 each extend through the housing 22 along the connection direction X1. A contact insertion hole 31 is provided in each of the contact holding portions 27 of the housing 22. In other words, the contact holding portion 27*a*, the contact holding portion 27*b*, and the contact holding portion 27*c* are each provided with a contact insertion hole 31.

The contact insertion hole 31 provided in the contact holding portion 27*a* extends through the contact holding portion a along the connection direction X1 from the insertion end portion 29*a* to the connection end portion 30*a*. In words, the contact insertion hole 31 of the contact holding portion 27*a* is provided as a through hole that extends from the insertion end portion 29*a* to the connection 30*a*, and is open to the outside at the insertion end portion 29*a* and also open to the outside at the connection end portion 30*a*. The contact 21*a* is inserted into the contact insertion hole 31 of the contact holding portion 27*a* from the insertion end portion 29*a* side, and is held in the contact insertion hole 31 by the contact holding portion 27*a*. Note that the contact 21*a* is connected to the electrical wire 10 before being inserted into the contact insertion hole 31 of the contact holding portion 27*a* from the contact connection portion 25 side, and the entirety of the contact 21*a* is accommodated inside the contact insertion hole 31 while being held by the contact holding portion 27*a*. While the contact 21*a* is held by the contact holding portion 27*a*, the electrical wire 10 connected to the contact 21*a* extends out from the insertion end portion 29*a* of the contact holding portion 27*a*.

The contact insertion hole 31 provided in the contact holding portion 27*b* extends through the contact holding portion 27*b* along the connection direction X1 from the insertion end portion 29*b* to the connection end portion 30*b*. In other words, the contact insertion hole 31 of the contact holding portion 27*b* is provided as a through hole that extends from the insertion end portion 29*b* to the connection end portion 30*b*, and is open to the outside at the insertion end portion 29*b* and also open to the outside at the connection end portion 30*b*. The contact 21*b* is inserted into the contact insertion hole 31 of the contact holding portion 27*b* from the insertion end portion 29*b* side, and is held in the contact insertion hole 31 by the contact holding portion 27*b*. Note that the contact 21*b* is connected to the electrical wire 10 before being inserted into the contact insertion hole 31 of the contact holding portion 27*b* from the contact connection portion 25 side, and the entirety of the contact 21*b* is accommodated inside the contact insertion hole 31 while being held by the contact holding portion 27*b*. While the contact 21*b* is held by the contact holding portion 27*b*, the electrical wire 10 connected to the contact 21*b* extends out from the insertion end portion 29*b* of the contact holding portion 27*b*.

The contact insertion hole 31 provided in the contact holding portion 27*c* extends through the contact holding portion 27*c* along the correction direction X1 from the insertion end portion 29*c* to the connection end portion 30*c*. In other words, the contact insertion hole 31 of the contact holding portion 27*c* is provided as a through hole that extends from the insertion end portion 29*c* to the connection end portion 30*c*, and is open to the outside at the insertion end portion 29*c* and also open to the outside at the connection end portion 30*c*. The contact 21*c* is inserted into the contact insertion hole 31 of the contact holding portion 27*c* from the insertion end portion 29*c* side, and is held in the contact insertion hole 31 by the contact holding portion 27*c*. Note that the contact 21*c* is connected to the electrical wire 10 before being inserted into the contact insertion hole 31 of the contact holding portion 27*c* from the contact connection portion 25 side, and the entirety of the contact 21*c* is accommodated inside the contact insertion hole 31 while being held by the contact holding portion 27*c*. While the contact 21*c* is held by the contact holding portion 27*c*, the electrical wire 10 connected to the contact 21*c* extends out from the insertion end portion 29*c* of the contact holding portion 27*c*.

Engagement Arms

As shown in FIGS. 2 to 4 and 6 to 12, engagement arms 32 are provided in the housing 22 so as to extend in a cantilevered manner from the connection end portion 30 side toward the insertion end portion 29. The engagement arms 32 are provided in the housing 22 as portions that engage with the contacts 21 inserted into the contact insertion holes 31.

A plurality of engagement arms 32 are provided in the housing 22 in correspondence with the contact holding portions 27 that hold the contacts 21, and in the present embodiment, a pair of engagement arms 32 are provided for each of the contact holding portions 27. In other words, in the housing 22 of the present embodiment, the engagement arms 32 are provided in correspondence with each of the three contact holding portions 27, and more specifically a pair of engagement arms 32 is provided for each of the contact holding portions 27. Accordingly two engagement arms 32 are provided in each of the contact holding portions 27. For this reason, a total of six engagement arms 32 are provided in the housing 22 of the present embodiment. Specifically, in the housing 22 of the present embodiment, the engagement arms 32 include engagement arms 32*a* provided in the contact holding portion 27*a*, engagement arms 32*b* provided in the contact holding portion 27*b*, engagement arms 32*b* provided in the contact holding portion 27*b*, and engagement arms 32*c* provided in the contact holding portion 27*c*.

The engagement arms 32*a* provided in the contact holding portion 27*a* are provided as a pair. In other words, the contact holding portion 27*a* is provided with two engagement arms 32*a*. The pair of engagement arms 32*a* provided in the contact holding portion 27*a* are provided so as to extend in a cantilevered manner from the connection end portion 30*a* side toward the insertion end portion 29*a* along the connection direction X1, and extend parallel with each other. The pair of engagement arms 32*a* are configured to engage with the contact 21*a* inserted into the contact insertion hole 31 of the contact holding portion 27*a*, and can hold the contact 21*a*.

The engagement arms 32*b* provided in the contact holding portion 27*b* are provided as a pair. In other words, the contact holding portion 27*b* is provided with two engagement arms 32*b*. The pair of engagement arms 32*b* provided in the contact holding portion 27*b* are provided so as to extend in a cantilevered manner from the connection end portion 30*b* side toward the insertion end portion 29*b* along the connection direction X1, and extend parallel with each other. The pair of engagement arms 32*b* are configured to engage with the contact 21*b* inserted into the contact insertion hole 31 of the contact holding portion 27*b*, and can hold the contact 21*h*.

The engagement arms 32*c* provided in the contact holding portion 27*c* are provided as a pair. In other words, the contact, holding portion 27*c* is provided with two engagement arms 32*c*. The pair of engagement arms 32*c* provided in the contact holding portion 27*c* are provided so as to extend in a cantilevered manner from the connection end portion 30*c* side toward the insertion end portion 29*c* along the connection direction and extend parallel with each other. The pair of engagement arms 32*c* are configured to engage with the contact 21*c* inserted into the contact insertion hole 31 of the contact holding portion 27*c*, and can hold the contact 21*c*.

The engagement arms 32*a* provided in the contact holding portion 27*a*, the engagement arms 32*b* provided in the contact holding portion 27*b*, and the engagement arms 32*c* provided in the contact holding portion 27*c* have a similar configuration, and all have the same shape. Given that the structures of the engagement arm 32*a*, the engagement arm 32*b*, and the engagement arm 32*c* are the same, the structure of one engagement arm 32 will be described below as the structure of the engagement arms 32 (32*a*, 32*b*, 32*c*).

The engagement arm 32 includes an engaged portion 33, an extension arm portion 34, and a base-side portion 35.

The engaged portion 33 is provided as a portion of the engagement arm 32 that engages with the engaging portion 26 of the contact 21. The engaged portion 33 is pro sided at an intermediate position in the engagement arm 32 that extends in a cantilevered manner from the connection end portion 30 side toward the insertion end portion 29. Also, the engaged portion 33 is provided as a protrusion portion that protrudes as a step toward the interior of the contact holding portion 27*a*, at an intermediate position in the engagement arm 32 that extends in a cantilevered manner. In other words, the engaged portion 33 is provided so as to protrude as a step within the contact insertion hole 31 inside the contact holding portion 27*a*, at an intermediate position in the engagement arm 32 that extends in a cantilevered manner.

Also, the engaged portion 33 that projects as a step from the engagement arm 32 is provided with arm end surface 33*a* that extends along a direction perpendicular to the connection direction X1 at the end portion on the connection end portion 30 side in the connection direction X1. The engaged portion 33 is configured to engage with the engaging portion 26 of the contact 21 by the end surface 33*a* abutting against the engaging portion 26. The engaged portion 33 is configured to be engaged with the engaging portion 26 of the contact 21 in a state in which the engaging portion 26 abuts against the engaged portion 33 from the connection end portion 30 side toward the insertion end portion 29 in the connection direction X1. For this reason, if the contact 21 is biased in a direction of coming out of the contact holding portion 27 while the engaged portion 33 and the engaging portion 26 are engaged, that is to say if the contact 21 is biased toward the insertion end portion 29 of the contact holding portion 27, the movement of the contact 21 toward the insertion end portion 29 of the contact holding portion 27 is restricted by the engagement between the engaged portion

33 and the engaging portion 26. Accordingly the contact 21 is prevented from coming out of the contact holding portion 27.

The extension arm portion 34 of the engagement arm 32 is provided as a tip-side portion of the engagement arm 32 that extends in a cantilevered manner, and is a portion that extends from the engaged portion 33 toward the insertion end portion 29. The extension portion 34 is arranged facing an inner wall 37, which is a wall surface defining the contact insertion hole 31 in the contact holding portion 27 of the housing 22, with a space therebetween, and extends along the inner wall 37 of the contact holding portion 27. More specifically the extension area portion 34 faces a portion of the inner wall 37, which defines the contact insertion hole 31 in the contact holding portion 27, that is on the side corresponding to the insertion end portion 29 of the contact holding portion 27, with a space therebetween. Also, the extension area portion 34 is arranged facing the inner will 37 defining the contact insertion hole 31 in the contact holding portion 27 with a space therebetween, in a direction perpendicular to the connection direction X1. In the present embodiment, the inner wall 37 of the contact holding portion 27, which the extension arm portion 34 faces with a space therebetween, provided so as to extend parallel with the connection direction X1. As shown in FIGS. 6, 7, 9, 11, and 12, the portion of the extension arm portion 34 that faces the inner wall 37 is provided with a facing surface 34*b* that extends in the connection direction X1 and is with the inner wall 37.

The engaged portion 33 of the engagement arm 32 engages with the engaging portion 26 of the contact 21 inserted into the contact insertion hole 31 of the contact holding portion 27. While the engagement arm 32 and the contact 21 are engaged with each other, the engaging portion 26 and the engaged portion 33 abut against each other in the connection direction X1 and are engaged, and thus movement of the contact 21 toward the insertion end portion 29 of the contact holding portion 27 is restricted. In this state, if the contact 21 is biased toward the insertion end portion 29, the engaging portion 26 of the contact 21 biases the engaged portion 33 of the engagement arm 32 toward the insertion end portion 29. If the engaged portion 33, which protrudes inward in the contact holding portion 27 at an intermediate position in the engagement arm 32 that extends cantilevered toward the insertion end portion 29, is biased toward the insertion end portion 29 by the engaging portion 26, the engagement arm 32 elastically deforms and flexes. At this time, the engagement arm 32 flexes toward the inner wall 37 of the contact holding portion 27, which is the side opposite to the interior of the contact holding portion 27 where the engaged portion 33 is provided in the engagement arm 32. Due to the engagement arm 32 flexing toward the inner wall 37, the extension arm portion 34, which is the tip-side portion of the engagement arm 32 that extends from the engaged portion 33 further toward the insertion end portion 29, becomes displaced toward the inner wall 37, and the tip side of the extension arm portion 34 abuts against the inner wall 37 of the contact holding portion 27. In this manner, the extension arm portion 34 is configured such that the tip side of the extension arm portion 34 abuts against the inner wall 37 of the contact holding portion 27 in the case where the contact 21 is biased toward the insertion end portion 29 such that the engaging portion 26 biases the engaged portion 33 and the engagement arm 32 elastically deforms and flexes. Furthermore, the extension arm portion 34 is configured such that when the engagement arm 32 flexes, the tip side of the extension arm portion 34 abuts against the inner wall 37 of the contact holding portion 27, thus restricting the flexing amount of the engagement arm 32.

After being connected to the electrical wire 10, the contact 21 is inserted into the contact insertion hole 31 and held by the contact holding portion 27. For this reason, if the electrical wire 10 connected to the contact 21 inserted into the contact insertion hole 31 is subjected to an external force acting in a direction of pulling the contact 21 toward the insertion end portion 29, the contact 21 becomes biased toward the insertion end portion 29, and the engaging portion 26 biases the engaged portion 33 toward the insertion end portion 29. When the engaging portion 26 biases the engaged portion 33, as described above, the engagement arm 32 elastically deforms and flexes, and the tip side of the extension arm portion 34 of the engagement arm 32 abuts against the inner wall 37 of the contact holding portion 27 that defines the contact insertion hole 31, and thus the flexing amount of the engagement arm 32 is restricted. For this reason, the extension arm portion 34 is configured such that when the engagement arm 32 elastically deforms and flexes due to the electrical wire 10 connected to the contact 21 inserted into the contact insertion hole 31 being subjected to an external force acting in a direction of pulling the contact 21 toward the insertion end portion 29, the tip side of the extension arm portion 34 abuts against the inner wall 37 of the contact holding portion 27, thus restricting the flexing amount of the engagement arm 32.

Also, the extension arm portion 34 is provided with an inclined surface 34*a* formed as a surface that faces the interior of the contact holding portion 27. The inclined surface 34*a* of the extension arm portion 34 is provided as a surface that extends obliquely relative to the direction from the connection end portion 30 of the contact holding portion 27 toward the insertion end portion 29. Also, the inclined surface 34*a* of the extension arm portion 34 is provided so as to approach the inner wall 37 side of the contact holding portion 27 facing the extension arm portion 34 while extending toward the insertion end portion 29 of the contact holding portion 27. Accordingly, the inclined surface 34*a* of the extension arm portion 34, which is on the tip side of the engagement arm 32 that extends toward the insertion end portion 29 of the contact holding portion 27, is provided so as to approach the inner wall 37 of the contact holding portion 27 defining the contact insertion hole 31 while extending toward the insertion end portion 29. The inclined surface 34*a* is provided so as to be continuous, without a level difference, with the engaged portion 33 that protrudes inward in the contact holding portion 27 on the connection end portion 30 side. For this reason, when the contact 21 is inserted into the contact insertion hole 31 from the insertion end portion 29 side, the contact 21 moves smoothly along the inclined surface 34*a* while sliding on the inclined surface 34*a*. Then, when the engaging portion 26 of the contact 21 reaches the position of the engaged portion 33, the engaging portion 26 rides over the engaged portion 33 and passes the engaged portion 33, and the engaging portion 26 engages with the engaged portion 33.

The base-side portion 35 of the engagement arm 32 is configured as a base-side portion of the engagement arm 32 that extends in a cantilevered manner from the connection end portion 30 side toward the insertion end portion 29 in the housing 22. The base-side portion 35 and the extension arm portion 34 are continuous with each other, and the extension arm portion 34 extends toward the insertion end portion 29 on the insertion end portion 29 side of the base-side portion 35. Also, the base-side portion 35 is exposed to the outside of the housing 22 and constitutes a part of the wall portion of the housing 22. More specifically, the base-side portion 35 constitutes a wall portion that is exposed to the outside of the housing 22 in a portion on the connection end portion 30 side of the contact holding portion 27 of the housing 22. Note that as shown in FIGS. 3, 4, 6, 8, 9, and 11, slits 36 for forming the engagement arm 32, which is elastically deformable and extends in a cantilevered manner in the housing 22, are provided in the wall portion of the portion on the connection end portion 30 side of the contact holding portion 27 of the housing 22. The base-side portion 35 and the slits 36 are arranged so as to be exposed to the outside of the housing 22 in the wall portion of the portion on the connection end portion 30 side of the contact holding portion 27 of the housing 22.

Configurations Regarding Thickness of Portion of Housing on Connection End Portion Side In order for the connector 1 to be connected to the terminal block 11, which is the partner connection target, the housing 22 of the connector 1 is configured to be able to be connected to the terminal block 11 that is the partner connection target in accordance with a constraint in terms of the structure of the terminal block 11. For this reason, portions of the housing 22 on the side corresponding to the connection portions 30 for connection to the partner housing 12 of the terminal block 11 need to be configured to be able to be connected by fitting into the fitting holes 14 of the partner housing 12. In other words, portions on the connection end portion 30 side of the contact holding portions 27 of the housing 22 need to be configured to be able to be connected by fitting into the fitting holes 14 of the partner housing 12. For this reason, if the dimension in the widthwise direction of a cross section of the fitting holes 14 is reduced in accordance with a constraint in terms of the space for arranging of the fitting holes 14 in the partner housing 12, it is necessary to reduce the thickness of portions on the connection end portion 30 side of the contact holding portions 27 of the housing 22.

In the connector 1, the engagement arms 32, which engage with the contacts 21 inserted into the contact insertion holes 31, extend in a cantilevered manner from the side of the housing 22 corresponding to the connection end portions 30 of the contact holding portions 27 toward the insertion end portions 29. Accordingly, the extension arm portions 34, which are the tip-side portions of the engagement arms 32 that extend in a cantilevered manner, are arranged extending on the side of the housing 22 corresponding to the insertion end portions 29 of the contact holding portions 27. Also, the tip-side portions of the engagement arms 32 that extend in a cantilevered manner are housed inside portions on the insertion end portion 29 side of the contact holding portions 27. In other words, the portions on the insertion end portion 29 side of the contact holding portions 27 are provided so as to surround the tip-side portions of the engagement arms 32. For this reason, the tip-side portions of the engagement arms 32 are protected from the outside in the portions of the housing 22 on the insertion end portion 29 side of the contact holding portions 27.

On the other hand, the base-side portions 35, which are the portions on the base side of the engagement arms 32, are arranged in the portions on the connection end portion 30 side of the contact holding portions 27 of the housing 22, and the tip-side portions of the engagement arms 32 are not arranged in such portions. For this reason, in the portions on the connection end portion 30 side of the contact holding portions 27, it is not necessary to provide a protective wall structure surrounding the tip-side portions of the engagement arms 32 in order to protect the tip-side portions of the engagement arms 32. Accordingly it is possible to reduce the thickness of the portions on the connection end portion 30 side of the contact holding portions 27 of the housing 22. Therefore, with the connector 1, it is possible to meet a requirement to reduce the thickness of portions on the connection end portion 30 side of the contact holding portions 27 of the housing 22 due to a constraint in terms of the structure of the terminal block 11 that is the partner connection target to which the connector 1 is to be connected.

In other words, in the connector 1, it is possible to reduce the thickness of portions on the connection end portion 30 side of the contact holding portions 27 of the housing 22 in accordance with a constraint imposed by the partner connection target.

In the connector 1, the thickness is reduced in portions on the connection end portion 30 side of the contact holding portions 27 of the housing 22. As shown in FIGS. 9 and 10, a thickness dimension T1 of portions on the connection end portion 30 side of the contact holding portions 27 of the housing 22 is indicated by a double-headed arrow T1, and a thickness dimension T2 of portions on the insertion end portion 29 side of the contact holding portions 27 of the housing 22 is indicated by a double-headed arrow T2. In the housing 22 of the connector 1, the thickness of portions on the connection end portion 30 side of the contact holding portions 27 is thinner than the thickness of portions on the insertion end portion 29 side of the contact holding portions 27. In other words, the thickness dimension T1 of the portions on the connection end portion 30 side of the contact holding portions 27 is smaller than the thickness dimension T2 of the portions on the insertion end portion 29 side of the contact holding portions 27. More specifically the thickness dimension T1 in the width direction X2 of the portion on the connection end portion 30*a* side of the contact holding portion 27*a* is smaller than the thickness dimension T2 in the width direction X2 of the portion on the insertion end portion 29*a* side of the contact holding portion 27*a*. Also, the thickness dimension T1 in the front-rear direction X3 of the portion on the connection end portion 30*h* side of the contact holding portion 27*b* is smaller than the thickness dimension T2 in the front-rear direction X3 of the portion on the insertion end portion 29*b* side of the contact holding portion 27*b*. Furthermore, the thickness dimension T1 in the front-rear direction X3 of the portion on the connection end portion 30*c* side of the contact holding portion 27*c* is smaller than the thickness dimension T2 in the front-rear direction X3 of the portion on the insertion end portion 29*c* side of the contact holding portion 27*c*. Also, the thickness dimension T1 of the portions on the connection end portion 30 side of the contact holding portions 27 is set to a reduced thickness dimension that is in accordance with a constraint imposed by the dimension in the widthwise direction of the cross section of the fitting holes 14 of the partner housing 12 of the terminal block 11 that is the partner connection target.

Connector Operations

Figures 13A, 13B, 13C:
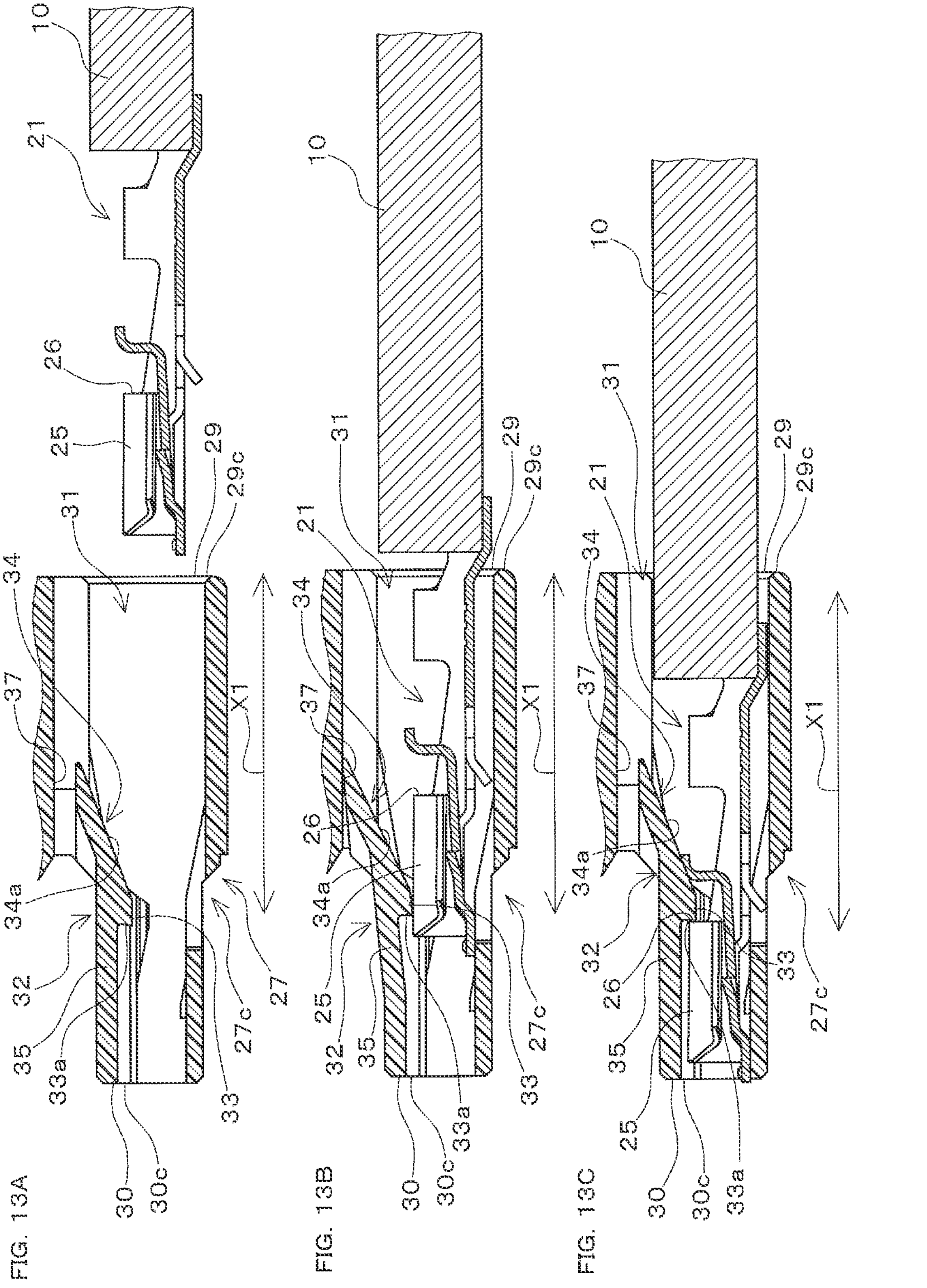
FIGS. 13A, 13B, and 13C are cross-sectional views of the contact and a portion of the housing, and are for describing operations of the connector when the contact is inserted into a contact insertion hole of the housing, where

Next, operations of the connector 1 described above will be described. First, regarding the connector 1, a description will be given for operations of the connector 1 when the contacts 21 are inserted into the housing 22 and the contacts 21 are held by the housing 22. FIGS. 13A, 13B and 13C are cross-sectional views of a contact 21 and a portion of the housing 22, and are for describing operations of the connector 1 in which the contact 21 is inserted into the contact insertion hole 31 of the housing 22. Note that FIG. 13A shows the state before the contact 21 is inserted into the contact insertion hole 31. FIG. 13B is a diagram showing a state in which the contact 21 is being inserted into the contact insertion hole 31. FIG. 13C is a diagram showing a state in which the contact 21 has been inserted into the contact insertion hole 31. Note that FIGS. 13A, 13B, and 13C show cross-sections of the contact 21*c* and a portion of the contact holding portion 27*c* of the housing 22. Also, FIGS. 13A, 13B, and 13C schematically show an electrical wire 10, and in these figures, the core wire 10*a* of the electrical wire 10 is not shown, and only the shape corresponding to the outer shape of the insulating covering 10*b* of the electrical wire 10 is shown in cross-section with uniform hatching.

As shown in FIG. 13A, when the contact 21 is inserted into the housing 22, the electrical wire 10 is connected to the contact 21 before the contact 21 is inserted into the contact insertion hole 31 provided in the contact holding portion 27 of the housing 22. The contact 21 is inserted into the contact insertion hole 31 from the end portion on the contact connection portion 25 side, which is the end portion opposite to the end portion connected to the electrical wire 10. The contact 21 is inserted into the contact insertion hole 31 from the insertion end portion 29 side of the contact holding portion 27 of the housing 22.

As shown in FIG. 13B, when the contact 21 is inserted into the contact insertion hole 31, the contact 21 moves through the contact insertion hole 31, which extends in the connection direction X1 through the contact holding portion 27 of the housing 22, from the insertion end portion 29 side toward the connection end portion 30. Then, when the contact 21 reaches a position where it abuts against the extension arm portion 34 of the engagement arm in the contact insertion hole 31, the tip portion of the contact connection portion 25 abuts against the inclined surface 34*a* of the extension arm portion 34.

When the contact 21 has been inserted into the contact insertion hole 31 and the tip portion of the contact connection portion 25 abuts against the inclined surface 34*a* of the extension arm portion 34, the engagement arm 32 is biased by the contact 21 toward the connection end portion 30 on the inclined surface 34*a*. When the engagement arm 32 is biased by the contact 21 on the inclined surface 34*a*, the extension arm portion 34 flexes toward the inner wall 37 side of the contact holding portion 27, which the extension arm portion 34 faces. Due to the engagement arm 32 flexing toward the inner wall 37 side, the tip portion of the contact connection portion 25 of the contact 21 smoothly moves along the inclined surface 34*a* while sliding on the inclined surface 34*a*. When the contact connection portion 25 of the contact 21 inserted into the contact insertion hole 31 reaches the position of the engaged portion 33 of the engagement arm 32, the contact connection portion 25 rides over engaged portion 33 and passes the engaged portion 33.

As shown in FIG. 13C, when the contact 21 is further inserted into the contact insertion hole 31 so that the contact connection portion 25 passes over the engaged portion 33, the engaging portion 26 of the contact 21 reaches the position of the engaged portion 33. When the engaging portion 26 of the contact 21 reaches the position of the engaged portion 33 of the engagement arm 32, the engaging portion 26 rides over the engaged portion 33 and passes the engaged portion 33. When the engaging portion 26, which is recessed as a step and serves as an edge portion of the contact connection portion 25, passes the engaged portion 33, the engagement arm 32 undergoes elastic recovery and the flexing of the engagement arm 32 relaxes, and thus the engaged portion 33 become displaced so as to fit into the engaging portion 26. Accordingly the engaging portion 26 engages with the engaged portion 33 of the engagement arm 32. Due to the engaging portion 26 of the contact 21 engaging with the engaged portion 33 of the engagement arm 32, the contact 21 is held by the contact holding portion 27 of the housing 22.

Figure 14:
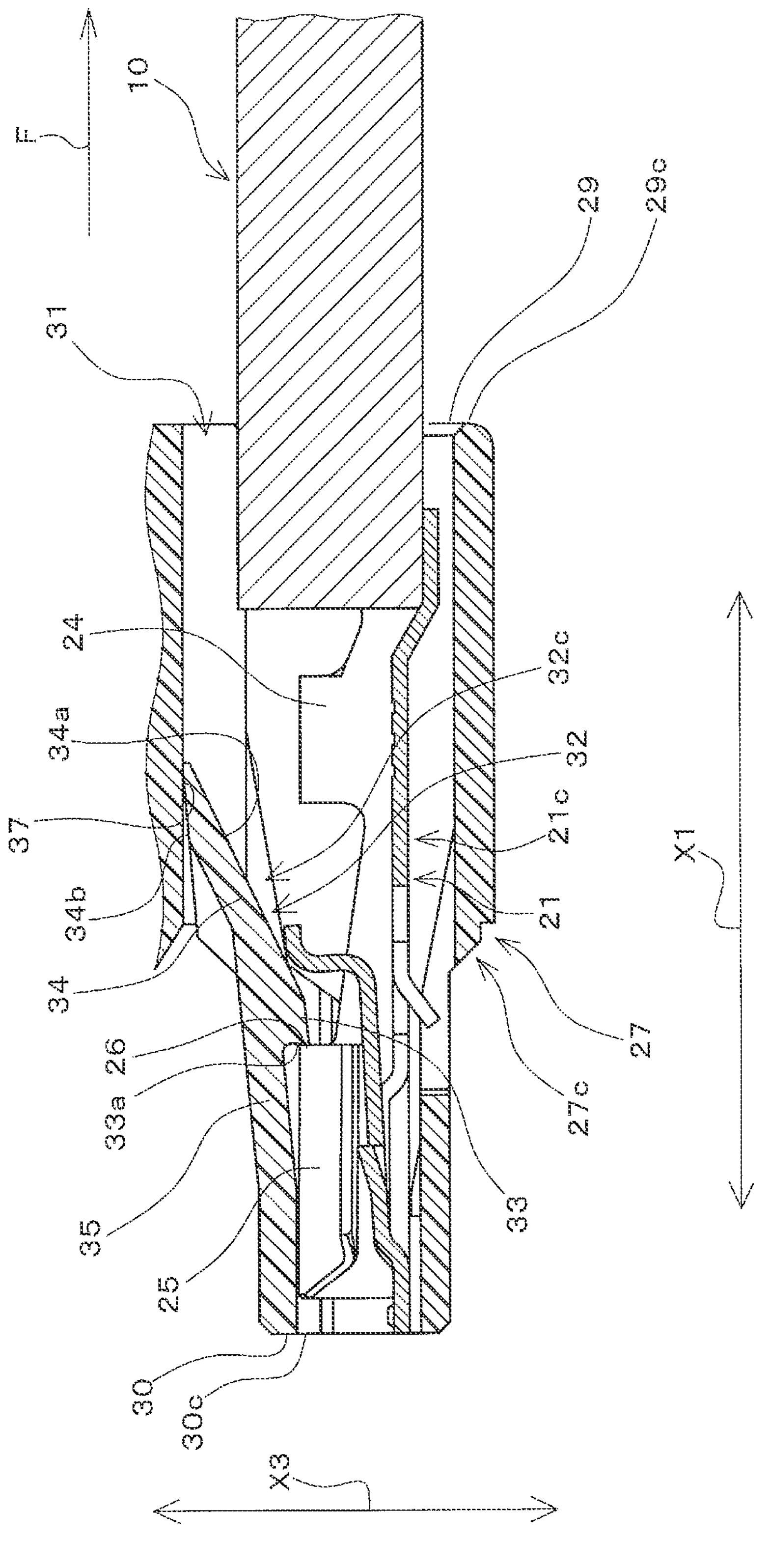
FIG. 14 is a cross-sectional view of the contact and a portion of the housing, and is for describing operations of the connector in the case where an electrical wire connected to the contact is subjected to external force acting in a direction of withdrawing the contact from the housing.

Next, operations of the connector 1 when the contact 21 held by the housing 22 is biased in the direction of coming out of the housing 22 will be described. FIG. 14 is a cross-sectional view of the contact 21 and a portion of the housing 22, and is for describing operations of the connector 1 when the electrical wire 10 connected to the contact 21 is subjected to an external force acting in the direction of withdrawing the contact 21 from the housing 22. FIG. 14 shows a cross-section of the contact 21*c* and the contact holding portion 27*c* of the housing 22. In FIG. 14, an arrow F indicates the direction of an external force acting on the electrical wire 10 in the direction of withdrawing the contact 21 from the housing 22. Also, FIG. 14 schematically show an electrical wire 10, and in this figure, the core wire 10*a* of the electrical wire 10 is not shown, and only the shape corresponding to the outer shape of the insulating covering 10*b* of the electrical wire 10 is shown in cross-section with uniform hatching.

As shown in FIG. 14, when the electrical wire 10 connected to the contact 21 held in the housing 22 is subjected to an external force acting in a direction of withdrawing the contact 21 from the housing 22, the contact 21 is biased in a direction of withdrawal from the housing 22. When the contact 21 is biased in the direction of withdrawal from the housing 22, the contact 21 is biased toward the insertion end portion 29 of the contact holding portion 27 of the housing 22. At this time, the engaging portion 26 of the contact 21 abuts against the end surface 33*a* of the engaged portion 33 of the engagement arm 32 and is engaged with the engaged portion 33, and thus movement of the contact 21 toward the insertion end portion 29 is restricted. For this reason, when the engaged portion 33, which projects inward in the contact holding portion 27 at an intermediate position in the engagement arm 32 that extends in a cantilevered manner, is biased toward the insertion end portion 29 by the engaging portion 26 of the contact 21, the engagement arm 32 elastically deforms and flexes. At this time, the engagement arm 32 flexes toward the inner wall 37 of the contact holding portion 27, which is the side opposite to the interior of the contact holding portion 27 where the engaged portion 33 is provided in the engagement arm 32. Due to the engagement arm 32 flexing toward the inner wall 37, the extension arm portion 34, which is the tip-side portion of the engagement arm 32 that extends from the engaged portion 33 further toward the insertion end portion 29, becomes displaced toward the inner wall 37, and the tip side of the extension arm portion 34 abuts against the inner wall 37 of the contact holding portion 27. The engagement arm 32 flexes toward the inner wall 37, and the tip side of the extension arm portion 34 abuts against the inner wall 37, and thus the flexing amount of the engagement arm 32 is restricted.

When an external force acts on the electrical wire 10 and the contact 21 is biased in the direction of withdrawal from the housing 22, the engagement arm 32 flexes and the extension arm portion 34 of the engagement arm 32 abuts against the inner wall 37 of the contact holding portion 27, and thus the flexing amount of the engagement arm 32 is restricted. For this reason, it is possible to prevent the case where the engaging portion 26 of the contact 21 and the engaged portion 33 of the engagement arm 32 become disengaged, and the contact 21 comes out of the housing 22. Accordingly, even if an external force acts on the electrical wire 10, and the contact 21 becomes biased in the direction of withdrawal from the housing 22, the contact 21 remains held by the housing 22, and the contact 21 is prevented from coming out of the housing 22.

Figure 15A:
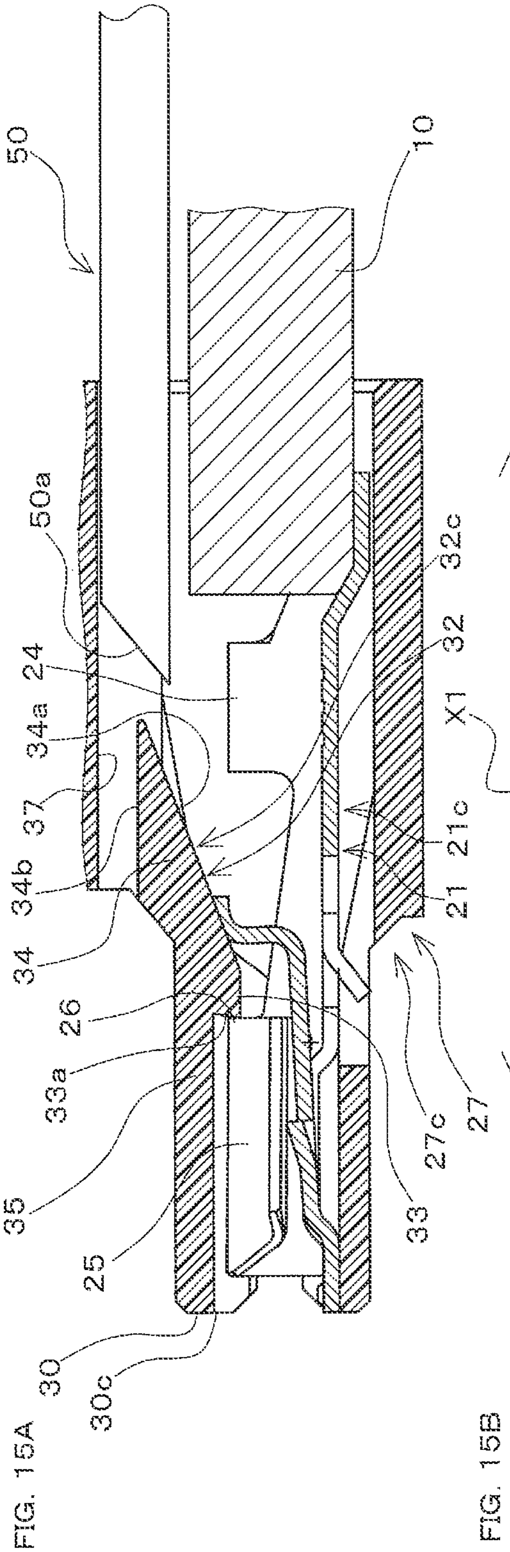
FIGS. 15A and 15B are cross-sectional views of the contact and a portion of the housing, and is for describing operations of the connector when removing the contact from the housing, where
Figure 15B:
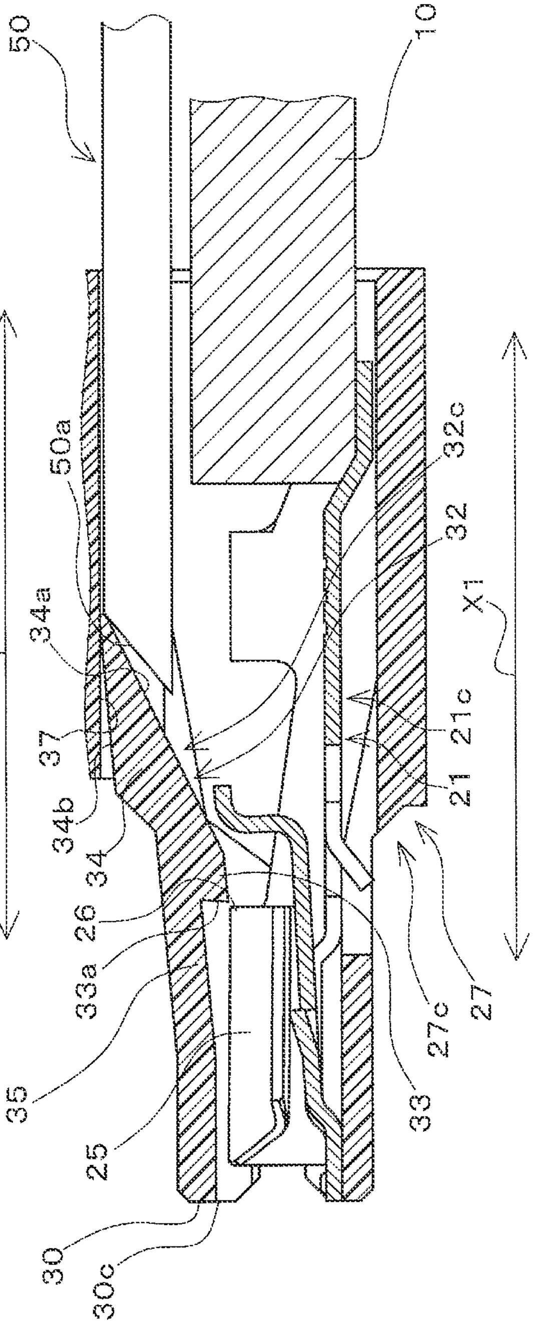

Next, operations of the connector 1 when removing the contact 21 from the housing 22 will be described. FIGS. 15A and 15B are cross-sectional views of a contact 21 and a portion of the housing 22, and are for describing operations of the connector 1 when the contact 21 is removed from the housing 22. Note that FIG. 15A is a diagram showing a state in which a contact removing jig 50 has been inserted into the contact insertion hole 31. Also, FIG. 15B is a diagram showing a state where the contact removing jig 50 is in contact with the engagement arm 32 of the housing 22. Note that FIGS. 15A and 15B are cross-sectional views of the contact 21*c* and a portion of the contact holding portion 27*c* of the housing 22. Also, FIGS. 15A and 15B schematically show an electrical wire 10, and in these figures, the core wire 10*a* of the electrical wire 10 is not shown, and only the shape corresponding to the outer shape of the insulating covering 10*b* of the electrical wire 10 is shown in cross-section with uniform hatching.

As shown in FIG. 15A, a contact removing jig 50 is used when removing the contact 21 held by the housing 22 from the housing 22. The jig 50 is formed in an elongated mud shape fir insertion into the contact insertion hole 31, and is shaped as a rod that extends with a rectangular cross section, for example. The jig 50 is shaped as a rod whose cross-section is sized so as to be insertable into a gap between the inner surface of the contact insertion hole 31 and the outer surface of the electrical wire 10 that is connected to the contact 21 held by the housing 22 and that extends from the contact insertion hole 31. Also, the tip-side end portion of the jig 50 is provided with an inclined surface 50*a* is inclined relative to the lengthwise direction of the jig 50. For this reason, the tip-side end portion of the jig 50 has a pointed shape that narrows toward the tip.

When removing the contact 21 from the housing 22, the jig 50 is inserted into the contact insertion hole 31 provided in the contact holding portion 27 of the housing 22 from the insertion end portion 29 side of the contact holding portions 27. At this time, the tip side of the jig 50, where the inclined surface 50*a* is provided, is inserted into the contact insertion hole 31 of the contact holding portion 27. When the jig 50 is inserted into the contact insertion hole 31, the tip-side end portion of the jig 50 moves along the contact insertion hole 31 toward the connection end portion 30 of the contact holding portion 27.

As shown in FIG. 15B, when the jig 50 is inserted to a deep position in the contact insertion hole 31, the inclined surface 50*a* in the tip-side end portion 50 comes into contact with the inclined surface 34*a* of the extension arm portion 34, which is the tip-side portion of the engagement arm 32. When the inclined surface 50*a* of the jig 50 and the inclined surface 34*a* of the extension arm portion 34 come into contact with each other, the extension arm portion 34 becomes biased toward the inner wall 37 of the contact holding portion 27. Due to the extension arm portion 34 being biased toward the inner wall 37, the engagement arm 32 flexes toward the inner wall 37. Due to the engagement arm 32 flexing toward the inner wall 37, the engaged portion 33 of the engagement arm 32 becomes displaced and separates from the engaging portion 26 of the contact 21 in a direction perpendicular to the connection direction X1. Accordingly the engaged portion 33 and the engaging portion 26 become disengaged. Note that when the contact 21 is removed from the housing 22 using the jig 50, force for biasing the contact 21 toward the insertion end portion 29 is not applied this reason, friction does not occur between the engaged portion 33 and the engaging portion 26 when the contact 21 is biased toward the insertion end portion 29, and the engaged portion 33 and the engaging portion 26 can become disengaged by the engaged portion 33 shifting relative to the engaging portion 26 in a direction perpendicular to the connection direction X1.

When the engaged portion 33 of the engagement arm 32 and the engaging portion 26 of the contact 21 become disengaged, the contact 21 can be removed from the housing 22. In this state, if the electrical wire 10 connected to the contact 21 is pulled out from the housing 22, that is to say if the electrical wire 10 is pulled along the direction from the connection end portion 30 toward the insertion end portion 29, the contact 21 moves toward the insertion end portion 29 along with the electrical wire 10. Accordingly, the contact 21 is pulled out from the contact insertion hole 31 and removed from the housing 22.

Actions and Effects of Present Embodiment

According to the present embodiment, the engagement arm 32, which engages with the contact 21 inserted into the contact insertion hole 31, extends in a cantilevered manner from the connection end portion 30 side of the housing 22 toward the insertion end portion 29. Accordingly the tip-side portion of the engagement arm 32 extending in a cantilevered manner is arranged extending on the insertion end portion 29 side of the contact holding portion 27 of the housing 22. For this reason, the tip-side portion of the engagement arm 32 extending in a cantilevered manner is housed inside the portion on the insertion end portion 29 side of the contact holding portion 27 of the housing 22, and protected from the outside. Accordingly, it is possible to meet a requirement to reduce the thickness of the portion on the connection end portion 30 side of the contact holding portion 27 of the housing 22 due to a constraint in terms of the structure of the terminal block 11 that is the partner connection target to which the connector 1 is to be connected. In other words, according to the present embodiment, it is possible to realize the connector 1 that enables reducing the thickness of the portion on the connection end portion 30 side of the contact holding portion 27 of the housing 22 in accordance with a constraint imposed by the terminal block 11 that is the partner connection target.

Also, according to the present embodiment, the engaged portion 33, which is provided at intermediate position in the cantilever extending direction, of the engagement arm 32 engages with the engaging portion 26 of the contact 21, and the extension arm portion 34, which is the tip-side portion of the engagement arm 32, extends from the engaged portion 33 toward the section end portion 29. Also, the extension arm portion 34 is arranged facing the inner wall 37 of the contact holding portion 27 of the housing 22, which defines the contact insertion hole 31, with a space therebetween, and extends along the inner wall 37, and furthermore, when the contact 21 is biased toward the insertion end portion 29 and the engagement arm 32 flexes, the tip side of the extension arm portion 34 abuts against the inner wall 37 of the contact holding portion 27 of the housing 22, which defines the contact insertion hole 31, thus restricting the flexing amount of the engagement arm 32. For this reason, if the contact 21 engaged with the engagement arms 32 is biased in a direction of coming out of the housing 22, that is to say if the contact 21 is biased toward the insertion end portion 29 of the housing 22, the engagement arm 32 flexes, and the extension arm portion 34 on the tip side of the engagement arm 32 abuts against the inner wall 37 of the contact holding portion 27 of the housing 22, thus restricting the flexing amount of the engagement arm 32. Since the flexing amount of the engagement arm 32 is restricted due to the extension arm portion 34 abutting against the inner wall 37 of the contact holding portion 27 of the housing 22, it is possible to prevent disengagement of the engaging portion 26 of the contact 21 and the engaged portion 33 of the engagement arm 32, and prevent the contact 21 from coming out of the housing 22. Accordingly, the contact holding force for holding the contact 21 in the housing 22 can be improved. Also, according to the present embodiment, if the contact 21 engaged with the engagement arm 32 is biased in the direction of withdrawal from the housing 22, that is to say if the contact 21 is biased toward the insertion end portion 29 of the housing 22, the engagement arm 32 flexes, and the extension arm portion 34 abuts against the inner wall 37 of the contact holding portion 27 of the housing 22, thus restricting the flexing amount of the engagement arm 32. For this reason, it is possible to prevent excessive flexing of the engagement arm 32, and prevent the engagement arm 32 from becoming damaged.

Therefore, according to the present embodiment, it is possible to provide the connector 1 that enables reducing the thickness of the portion on the connection end portion 30 side of the housing 22 in accordance with a constraint imposed by the partner connection target, enables improving the contact holding force for holding the contact 21 in the housing 22, and enables preventing damage to the engagement arm 32 that engages with the contact 21.

Also, according to the present embodiment, the base-side portion 35 of the engagement arm 32, which extends in a cantilevered manner from the connection end portion 30 side of the housing 22 toward the insertion end portion 29, constitutes a portion of the wall portion of the housing 22 that is exposed to the outside. For this reason, the base-side portion 35 of the engagement arm 32 arranged on the connection end portion 30 side of the housing 22 can also serve as a portion of the wall portion on the connection end portion 30 side of the housing 22, thus making it possible to further reduce the thickness of the portion on the connection end portion 30 side of the housing 22.

Also, according to the present embodiment, the extension arm portion 34 on the tip side of the engagement arm 32, which extends toward the insertion end portion 29, is provided with the inclined surface **34*a* that approaches the inner wall 37 of the contact holding portion 27 of the housing 22, which defines the contact insertion hole 31, while extending toward the insertion end portion 29. For this reason, when the contact 21 is inserted into the contact insertion hole 31 from the insertion end portion 29 side, the contact 21 smoothly moves along the inclined surface 34*a* of the extension arm portion 34 while sliding on the inclined surface 34*a*. Then, when the engaging portion 26 of the contact 21 passes the inclined surface 34*a* of the extension arm portion 34 and further rides over and passes the engaged portion 33 of the engagement arm 32, the engaging portion 26 and the engaged portion 33 engage with each other, and the contact 21 is held. Therefore, according to the present embodiment, when the contact 21 is inserted into the contact insertion hole 31, the engagement arm 32 and the contact 21** can smoothly engage with each other.

Also, according to the present embodiment, when the electrical wire 10 connected to the contact 21 is subjected to an external force acting in a direction of pulling the electrical wire 10 out of the connector 1, the engagement arm 32 flexes, and the tip side of the extension arm portion 34 abuts against the inner wall 37 of the contact holding portion 27 of the housing 22, which defines the contact insertion hole 31, thus restricting the flexing amount of the engagement arm 32. Accordingly if the electrical wire 10 is subjected to an external force acting in the withdrawal direction, the engaging portion 26 of the contact 21 and the engaged portion 33 of the engagement arm 32 are prevented from becoming disengaged, and the contact 21 is prevented from being removed from the housing 22. Accordingly the contact holding force for holding the contact 21 in the housing 22 can be improved when the electrical wire 10 is subjected to an external force acting in the withdrawal direction. Furthermore, when the electrical wire 10 is subjected to an external force acting in the withdrawal direction, the engagement arm 32 can be prevented from flexing excessively, and the engagement arm 32 can be prevented from becoming damaged.

Variations

Although an embodiment of the present invention has been described above, the present invention is not limited to the above-described embodiment, and various modifications can be made within the scope of the claims. In other words, the present invention is not limited to the embodiment described above, but rather the scope of the present invention is of course intended to include all variations, applications, and equivalents thereof encompassed in the scope of the appended claims as variations and applications that would become apparent by reading and understanding this specification. For example, modifications such as the following may be implemented.

(1) In the above-described embodiment, a mode is described in which the connector 1 includes a plurality of contacts 21, but the present invention is not limited to this. A mode is possible in which the connector 1 includes one contact 21. In other words, a mode is possible in which only one terminal holding portion 27 is provided in the housing 22 of the connector 1. Also, in the above-described embodiment, the connector 1 includes three contacts 21 as the plurality of contacts 21, but the present invention is not limited to this. In the connector 1, a mode is possible in which two contacts 21 or four or more contacts 21 are provided as the plurality of contacts 21. In other words, a mode is possible in which two or four or more terminal holding portions 27 are provided in the housing 22 of the connector 1.

(2) In the above-described embodiment, a mode is described in which the terminal block 11 is the partner connection target to which the connector 1 is to be connected, but the present invention is not limited to this. In other words, a mode is possible in which a member other than the terminal block 11 is the partner connection target to which the connector 1 is to be connected. For example, a mode is possible in which a partner connector that includes the partner contact 13 is the partner connection target to which the connector 1 is to be connected. Alternatively a mode is possible in which a substrate having the partner contact 13 mounted thereon is the partner connection target to which the connector 1 is to be connected.

(3) In the above-described embodiment, a mode is described in which the engaging portion 26 of the contact 21 is provided as the edge portion of the contact connection portion 25, but the present invention is not limited to this, and an engaging portion 26 in another mode may be used. For example, a mode is possible in which the engaging portion 26 is provided as a recession or a hole provided in the contact connection portion 25.

(4) In the above embodiment, a mode is described in which the contact holding portion 27 has a pair of engagement arms 32, but the present invention is not limited to this. For example, a mode is possible in which one engagement arm 32 is provided in the contact holding portion 27. Alternatively a mode is possible in which three or more engagement arms 32 are provided in the contact holding portion 27.

(5) In the above embodiment, a mode is described in which the inner wall 37 of the contact holding portion 27, which faces the extension arm portion 34 of the engagement arm 32 with a gap therebetween, extends parallel with the connection direction X1, and the facing surface 34*b* of the portion of the extension arm portion 34 that faces the inner wall 37 extends parallel with the connection direction X1 and the inner wall 37, but the present invention is not limited to this. A mode is possible in which the inner wall 37 of the terminal holding portion 27, which faces the extension arm portion 34 with a gap therebetween, and the facing surface 34*b* of the extension arm portion 34 do not extend parallel with the connection direction X1, and as one example, a variation such as that shown in FIG. 16 is possible.

Figure 16:
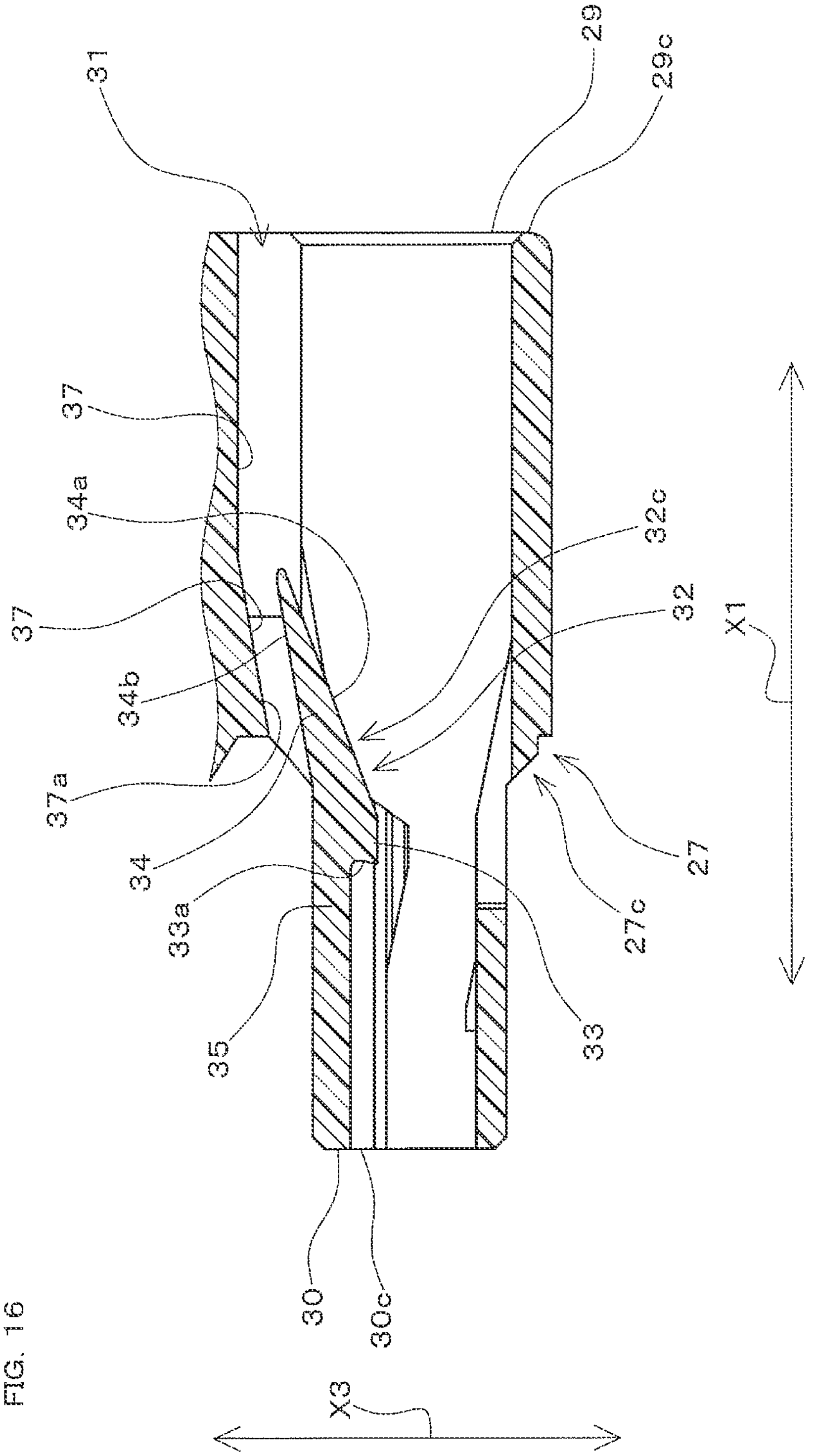
FIG. 16 is a view showing a cross-section of portion of the housing, and is for describing a variation of an extension arm portion of the engagement arm of the housing.

FIG. 16 is a view showing a cross-section of part of the housing 22, and is for describing a variation of the extension arm portion 34 of the engagement arm 32 of the housing 22. Note that FIG. 16 shows a cross-section of the contact holding portion 27*c* of the housing 22.

In the variation shown in FIG. 16, the inner wall 37 of the contact holding portion 27, which faces the extension arm portion 34 of the engagement arm 32 with a gap therebetween, is provided with an inclined surface portion 37*a* that extends obliquely relative to the connection direction X1, in a portion that faces the extension arm portion 34. More specifically, the portion of the inner wall 37 of the contact holding portion 27 other than the inclined surface portion 37*a*, that is to say the portion that does not face the extension arm portion 34, extends parallel with the connection direction X1. Also, the inclined surface portion 37*a* of the inner wall 37 of the contact holding portion 27, which faces the extension arm portion 34, approaches the extension arm portion 34 while extending toward the connection end portion 30, and extends obliquely relative to the connection direction X1.

Also, the facing surface 34*b* of the extension arm portion 34 of the engagement arm 32, which is the portion that faces the inner wall 37 of the contact holding portion 27, is provided so as to face the inclined surface portion 37*a* of the inner wall 37 with a space therebetween. Furthermore, the facing surface 34*b* of the extension arm portion 34 extends obliquely relative to the connection direction X1, and extends along a direction parallel with the inclined surface portion 37*a* of the inner wall 37 of the contact holding portion 27.

As in the variation shown in FIG. 16, a mode is possible in which the inner wall 37 of the terminal holding portion 27 facing the extension arm portion 34 with a space therebetween and the facing surface 34*b* of the extension arm portion 34 do not extend parallel with the connection direction X1.

(6) In the above embodiment, a mode is described in which the contact removing jig 50 is inserted into the contact insertion hole 31 from the insertion egad portion 29 side of the contact holding portion 27 in order to disengage the engagement, arm 32 and the contact 21, and the contact 21 is then reproved from the housing 22, but the present invention is not limited to this. A mode is possible in which the engagement arm 32 is provided with a configuration corresponding to the contact removing jig, and a contact removing jig having a form different from that of the jig 50 is used to remove the contact 21 from the housing 22. For example, variations such as the modes shown in FIGS. 17, 18A, and 18B may be implemented.

Figure 17:
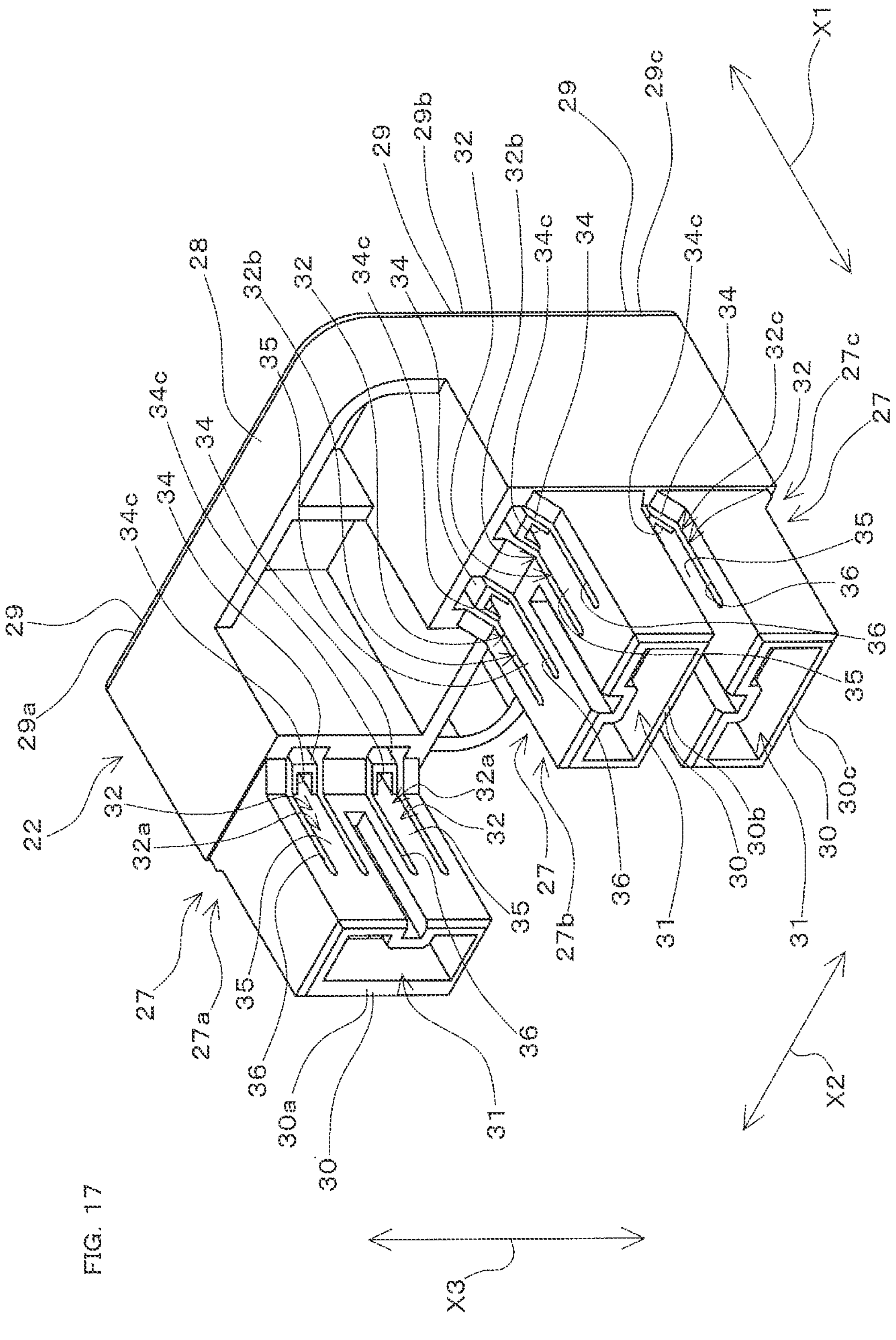
FIG. 17 is a perspective view of the housing, and is for describing a variation of the engagement arm of the housing.
Figure 18A:
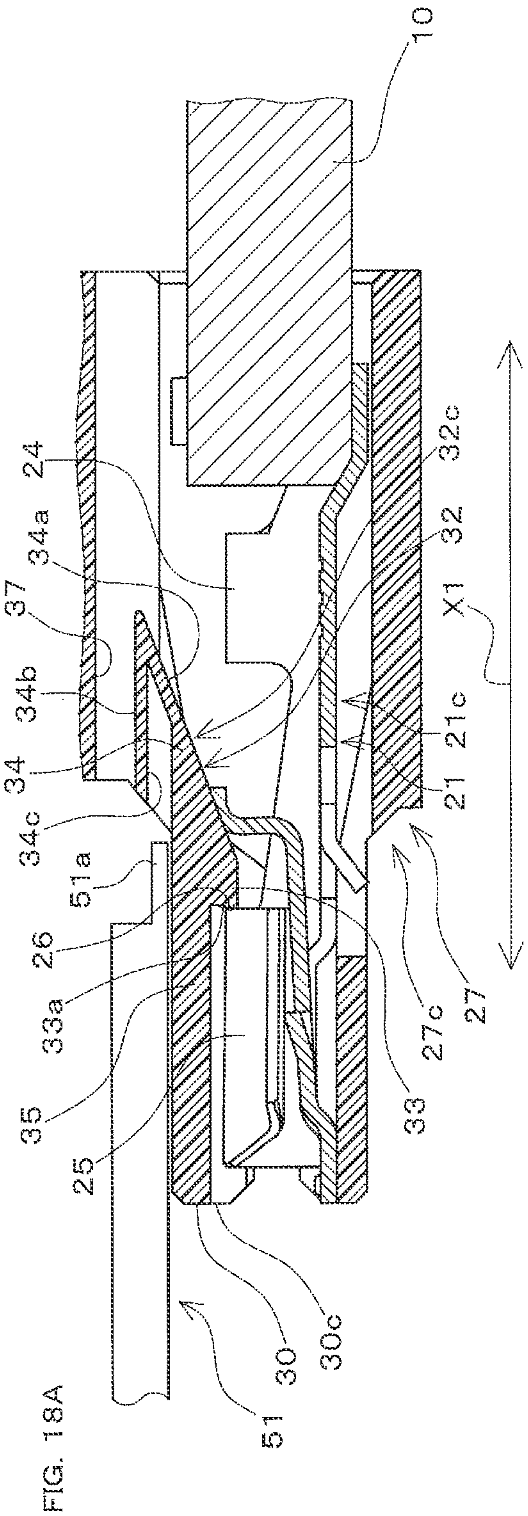
FIGS. 18A and 18B are diagrams for describing operations of the connector when removing the contact from the housing shown in FIG. 17, where
Figure 18B:
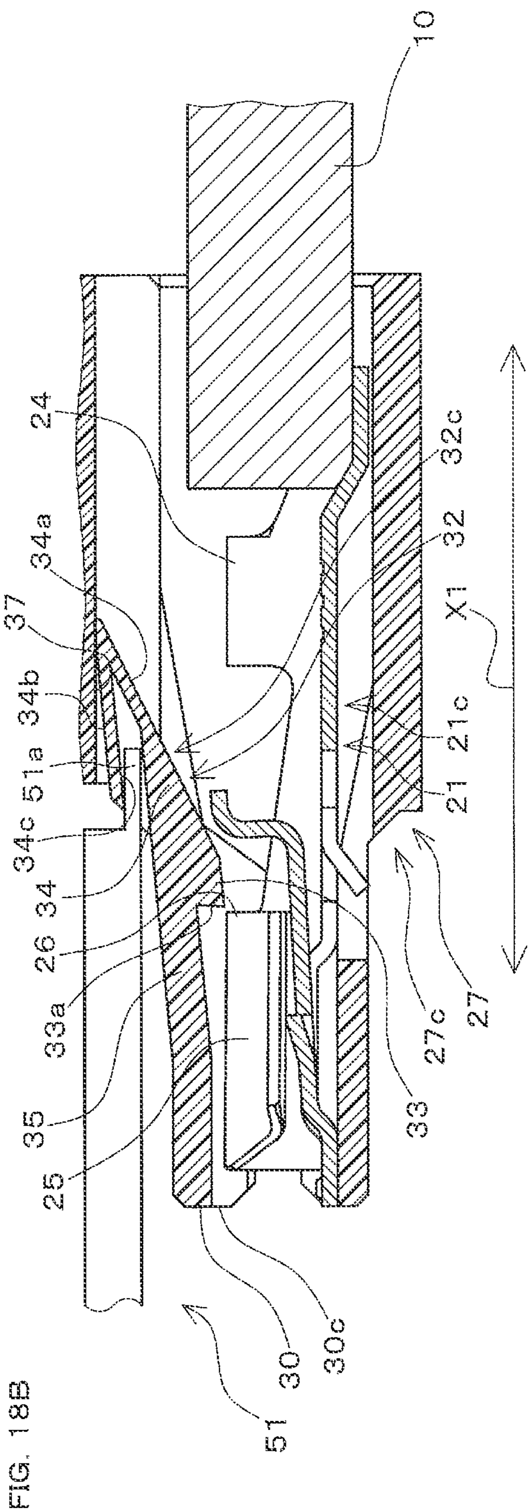

FIG. 17 is a perspective view of the housing 22 for describing a variation of the engagement arm 32 of the housing 22. FIGS. 18A and 18B are diagrams for describing operations of the connector 1 when removing the contact 21 from the housing 22 shown in FIG. 17. Note that FIG. 18A shows a state before the contact removing jig 51 is inserted into a jig hole 34*c* provided in the engagement arm 32 of the housing 22. Also, FIG. 18B is a diagram showing a state in which the contact removing jig 51 has been inserted into the jig hole 34*c* of the engagement arm 32. Note that FIGS. 18A and 18B show cross-sections of the contact 21 and a portion of the contact holding portion 27*c* of the housing 22. Also, FIGS. 18A and 18B schematically show an electrical wire 10, and in these figures, the core wire 10*a* of the electrical wire 10 is not shown, and only the shape corresponding to the outer shape of the insulating covering 10*b* of the electrical wire 10 is shown in cross-section with uniform hatching.

In the variation shown in FIGS. 17, 18A, and 18B, a contact removing jig 51 is used when removing the contact 21 held by the housing 22 from the housing 22. In the variation shown in FIGS. 17, 18A, and 18B, the engagement arm 32 of the housing 22 is provided with a configuration that corresponds to the contact removing jig 51.

As shown in FIGS. 18A and 18B, the jig 51 is formed in an elongated rod shape, and is shaped as a rod that extends with a rectangular cross section, for example. The tip-side end portion of the jig 51 is provided with an engaging projection 51*a* that can be inserted into a jig hole 34*c* provided in the engagement arm 32 of the housing 22 and can be engaged with the jig hole 34*c*. The engaging projection 51*a* is provided as a portion that extends as a protrusion from the tip-side end portion of the main body portion of the jig 51, with a cross-sectional area smaller than that of the main body portion of the jig 51 that extends with a rod-like shape.

As shown in FIGS. 17, 18A, and 18B, the extension arm portion 34 of the engagement arm 32 of the housing 22 is provided with the jig hole 34*c* for receiving insertion of the engaging projection 51*a* in the tip-side end portion of the jig 51. The jig hole 34*c* is provided in the extension arm portion 34 as an opening that faces the connection end portion 30 side of the contact holding portion 27. Also, the jig hole 34*c* is provided in the extension arm portion 34 as a hole that extends from the connection end portion 30 side of the contact holding portion 27 toward the insertion end portion 29.

As shown in FIG. 18A, when removing contact 21 from the housing 22, the jig 51 is inserted, from the connection end portion 30 side of the contact holding portion 27, into the jig hole 34*c* provided in the extension arm portion 34 of the engagement arm 32 of the housing 22. At this time, the engaging projection 51*a* on the tip side of the jig 51 is inserted into the jig hole 34*c* of the extension arm portion 34 that faces the connection end portion 30 side. When the engaging projection 51*a* of the jig 51 is inserted into the jig hole 34*c* of the engagement arm 32, the engaging projection 51*a* of the jig 51 moves so as to be fitted within the jig hole 34*c* of the engagement arm 32, and can engage with the jig hole 34*c*.

As shown in FIG. 18B, when the engaging projection 51*a* of the jig 51 is inserted into the jig hole 34*c* of the engagement arm 32, the jig 51 is then operated so as to be displaced relative to the housing 22 along a direction perpendicular to the connection direction X1. More specifically, while the engaging projection 51*a* is engaged with the jig hole 34*c*, the jig 51 is operated so as to be displaced relative to the housing 22 in a direction perpendicular to the connection direction X1, specifically a direction toward the inner wall 37 of the contact holding portion 27 that faces the extension arm portion 34. While the engaging projection 51*a* is engaged with the jig hole 34*c*, when the jig 51 is operated so as to be displaced relative to the housing 22 toward the inner wall 37 of the contact holding portion 27, the extension arm portion 34 of the engagement arm 32 becomes biased toward the inner wall 37 of the contact holding portion 27. Due to the extension arm portion 34 being biased toward the inner wall 37, the engagement arm 32 flexes toward the in per wall 37. Due to the engagement arm 32 flexing toward the inner wall 37, the engaged portion 33 of the engagement arm 32 becomes displaced and separates from the engaging portion 26 of the contact 21 in a direction perpendiculars to the connection direction X1. Accordingly, the engaged portion 33 and the engaging portion 26 become disengaged. Note that when the contact 21 is removed from the housing 22 using the jig 51, force for biasing the contact 21 toward the insertion end portion 29 is not applied. For this reason, friction does not occur between the engaged portion 33 and the engaging portion 26 when the contact 21 is biased toward the insertion end portion 29, and the engaged portion 33 and the engaging portion 26 can become disengaged by the engaged portion 33 shifting relative to the engaging portion. 26 in a direction perpendicular to the connection direction X1.

When the engaged portion 33 of the engagement arm 32 and the engaging portion 26 of the contact 21 become disengaged, the contact 21 can be removed from the housing 22. In this state, if the electrical wire 10 connected to the contact 21 is pulled out from the housing 22, that is to say if the electrical wire 10 is pulled along the direction from the connection end portion 30 toward the insertion end portion 29, the contact 21 moves toward the insertion end portion 29 along with the electrical wire 10. Accordingly, the contact 21 is pulled out from the contact insertion hole 31 and removed from the housing 22.

As shown in the variations shown in FIGS. 17, 18A, and 18B, a mode is possible in which, when the contact 21 held in the housing 22 is to be removed from the housing 22, a dedicated contact removing jig 51 is used, and the engagement arm 32 of the housing 22 is provided with the hole 34*c* in correspondence with the dedicated contact removing jig 51.

INDUSTRIAL APPLICABILITY

The present invention is broadly applicable as a connector that is for connection to a partner connection target and includes a contact, which is for connection to an electrical wire, and a housing for receiving insertion of the contact and holding the contact.

DESCRIPTION OF REFERENCE SIGNS

1 Connector
10 Electrical wire
11 Terminal block (partner connection target)
21 Contact
22 Housing
26 Engaging portion
29, 29*a*, 29*b*, 29*c* Insertion end portion
30, 30*a*, 30*b*, 30*c* Connection end portion
31 Contact insertion hole
32 Engagement arm
33 Engaged portion
34 Extension arm portion
37 Inner wall

What is claimed is:

1. A connector to be connected to a partner connection target, the connector comprising:

a contact configured to be connected to an electrical wire; and a housing configured to receive insertion of the contact and hold the contact, wherein the contact is provided with an engaging portion configured to engage with the housing when inserted into the housing, the housing is provided with:

an insertion end portion configured to receive insertion of the contact;

a connection end portion configured to be connected to the partner connection target;

a contact insertion hole extending through the housing from the insertion end portion to the connection end portion and configured to receive insertion of the contact; and an engagement arm extending in a cantilevered manner from a connection end portion side toward the insertion end portion and configured to engage with the contact inserted into the contact insertion hole, the engagement arm includes:

an engaged portion located at an intermediate position in the engagement arm extending in a cantilevered manner from the connection end portion side toward the insertion end portion, the engaged portion being configured to engage with the engaging portion; and an extension arm portion as a tip-side portion of the engagement arm extending in a cantilevered manner, the extension arm portion extending from the engaged portion toward the insertion end portion, the housing includes an inner wall defining the contact insertion hole, the extension arm portion extends along the inner wall while facing the inner wall with a space therebetween, and the extension arm portion is configured to restrict a flexing amount of the engagement arm by a tip side of the extension arm portion abutting against the inner wall in a case where the engagement arm elastically deforms and flexes due to the contact being biased toward the insertion end portion and the engaging portion biasing the engaged portion.

2. The connector according to claim 1, wherein the engagement arm extending in a cantilevered manner from the connection end portion side of the housing toward the insertion end portion includes a base-side portion that is exposed to an outside of the housing and constitutes a portion of a wall portion of the housing.

3. The connector according to claim 1, wherein the extension arm portion is provided with an inclined surface extending obliquely relative to a direction from the connection end portion side toward the insertion end portion, and the inclined surface approaches the inner wall faced by the extension arm portion while extending toward the insertion end portion.

4. The connector according to claim 1, wherein the extension arm portion is configured to restrict the flexing amount of the engagement arm by the tip side of the extension arm portion abutting against the inner wall in a case where the engagement arm elastically deforms and flexes due to the electrical wire connected to the contact inserted in the contact insertion bole being subjected to an external force acting in a direction of pulling the contact toward the insertion end portion.

* * * * *